United States Patent
Shellshear

(10) Patent No.: US 9,317,772 B2
(45) Date of Patent: Apr. 19, 2016

(54) METHOD FOR IMPROVING TRACKING USING DYNAMIC BACKGROUND COMPENSATION WITH CENTROID COMPENSATION

(71) Applicant: Canon Kabushiki Kaisha, Tokyo (JP)

(72) Inventor: Andrew John Shellshear, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/576,056

(22) Filed: Dec. 18, 2014

(65) Prior Publication Data

US 2015/0178568 A1    Jun. 25, 2015

(30) Foreign Application Priority Data

Dec. 23, 2013    (AU) ................................ 2013273831

(51) Int. Cl.
- *G06K 9/00* (2006.01)
- *G06K 9/46* (2006.01)
- *G06T 7/20* (2006.01)

(52) U.S. Cl.
CPC .............. *G06K 9/4647* (2013.01); *G06T 7/204* (2013.01); *G06T 7/208* (2013.01); *G06K 2209/015* (2013.01); *G06T 2207/30196* (2013.01)

(58) Field of Classification Search
CPC ............ G06K 2209/21; G06K 9/4642; G06K 9/4647; G06T 7/20; G06T 7/2013; G06T 7/2026; G06T 7/204; G06T 7/2046; G06T 7/2053; G06T 7/208; G06T 5/40; G06T 7/403; G08B 13/19604
See application file for complete search history.

(56) References Cited

U.S. PATENT DOCUMENTS

| | | | | |
|---|---|---|---|---|
| 6,590,999 B1* | 7/2003 | Comaniciu | ............... | G06K 9/32 348/416.1 |
| 8,374,388 B2* | 2/2013 | Stolkin | ................ | G06K 9/3241 382/103 |
| 2007/0122001 A1* | 5/2007 | Wang | ................. | G06K 9/00208 382/103 |
| 2007/0237359 A1* | 10/2007 | Sun | ....................... | G06T 7/2066 382/103 |
| 2008/0133434 A1* | 6/2008 | Asar | .................... | G06N 99/005 706/12 |
| 2010/0067741 A1* | 3/2010 | Stolkin | ................ | G06K 9/3241 382/103 |
| 2011/0128374 A1* | 6/2011 | Shellshear | ............... | H04N 7/18 348/135 |
| 2015/0104066 A1* | 4/2015 | Shellshear | ......... | G06K 9/00778 382/103 |

OTHER PUBLICATIONS

Wren et al., "Pfinder: Real-Time Tracking of the Human Body", IEEE Transactions on Pattern Analysis and Machine Intelligence, Jul. 1997, pp. 780-785, vol. 19 No. 7.

(Continued)

*Primary Examiner* — Avinash Yentrapati
(74) *Attorney, Agent, or Firm* — Canon U.S.A., Inc. IP Division

(57) ABSTRACT

A method for tracking an object across a number of image frames comprises identifying a region containing the object in a first image frame to be stored as an exemplar view of the object. An appearance model (modified Exemplar View histogram is created based on the region in the first image frame and a background region in a second image frame, and the method determines at least one of a location and size of a predicted region for tracking the object in the second image frame using the appearance model. The method corrects at least one of the determined location and size of the predicted region in the second image frame in accordance with at least one of the location and size of the region in the first image frame corresponding to the exemplar view of the object.

20 Claims, 12 Drawing Sheets

(56) References Cited

OTHER PUBLICATIONS

Elgammal et al., "Non-parametric Model for Background Subtraction", Computer Vision—ECCV 2000, 6th European Conference on Computer Vision, Dublin, Ireland, Jun. 26-Jul. 1, 2000 Proceedings, Part II, pp. 751-767, Print ISBN 978-3-540-67686-7, Online ISBN 978-3-540-45053-5.

Collins et al., "Algorithms for Cooperative Multisensor Surveillance", Proceedings of the IEEE, vol. 89, No. 10, Oct. 2001, pp. 1456-1477.

Broida et al., "Estimation of Object Motion Parameters from Noisy Images", IEEE Transactions on Pattern Analysis and Machine Intelligence, vol. PAMI-8, No. 1, Jan. 1986, pp. 90-99.

Comaniciu et al., "Kernel-Based Object Tracking", IEEE Transactions on Pattern Analysis and Machine Intelligence, vol. 25, Issue 5, pp. 564-577, May 2003.

Bradski, Gary R., "Computer Vision Face Tracking for Use in a Perceptual User Interface", Intel Technology Journal Q2 1998 pp. 1-15.

Shi et al., "Good Features to Track", IEEE Conference on Computer Vision and Pattern Recognition, pp. 593-600, (1994).

Chang et al., "PTZ Camera Target Tracking in Large Complex Scenes", Proceedings of the 8th World Congress on Intelligent Control and Automation, Jul. 6-9, 2010, Jinan, China, pp. 2914-2918.

\* cited by examiner

Fig. 1B     Fig. 1C

METHOD FOR IMPROVING TRACKING USING DYNAMIC BACKGROUND COMPENSATION WITH CENTROID COMPENSATION

REFERENCE TO RELATED PATENT APPLICATION(S)

This application claims the benefit under 35 U.S.C. §119 of the filing date of Australian Patent Application No. 2013273831, filed Dec. 23, 2013, hereby incorporated by reference in its entirety as if fully set forth herein.

TECHNICAL FIELD

The present disclosure relates generally to video analytics and, in particular, to a method, system and apparatus for tracking video objects in the presence of scene background having similar appearance to the video objects.

BACKGROUND

There is a long history of video analytic technologies designed to analyse digital video and track video objects.

Many video tracking systems use some form of foreground separation to work out what is moving in the scene, and what is stationary. This can be as simple as looking at the pixel differences between each frame ("frame differencing"), and can get quite complex, taking into account obfuscating factors such as camera movement, shadows, reflections, and background movements such as water ripples, tree movement, and escalator movement.

Foreground separation can be used as input to a geometric tracker (i.e. a tracker that treats each connected foreground region as an object to be tracked). Point tracking methods such as Kalman filters can then be used to track the objects. Such a tracker works well on individual objects moving through the scene but is poor at following tracks that touch each other, as it does not distinguish foreground objects from each other.

Visual Signature Algorithms (also known as Kernel Trackers) are algorithms capable of tracking objects by analysing the scene for objects of a similar appearance to the known tracks. Existing Visual Signature Algorithms include Mean-Shift, CamShift, and KLT.

The Mean-shift tracker is a Visual Signature algorithm that requires initialisation with an Exemplar View of an object. An Exemplar View is the region of an image representing the object to be tracked. The Exemplar View can be provided either by a geometric tracker or a specialised detector, e.g. a Human Body Detection algorithm. The mean-shift tracker then creates an Exemplar View Histogram, a histogram of the Exemplar View. Many different histogram types are possible, including three dimensional pixel histograms of RGB or YCbCr, one dimensional pixel histograms of Hue (ignoring pixels with brightness or saturation below a fixed threshold), and higher dimensional histograms that take into account such features as luma gradients and textures.

On each subsequent video frame, the mean-shift tracker creates a Back Projection, being a Probability Density Function (PDF) of the video frame, mapping each pixel or area of the current video frame to a corresponding normalised histogram value. Then, starting at the predicted location of the track, a mean-shift procedure (an iterated shifting of the centroid of the object using the first moment of values of the back projection within a bounding box of the object) is used to find a local maxima of the PDF. The predicted location of the track can simply be the same position as in the previous frame, or it could take into account known behaviour of the track so far (e.g. using a Kalman filter.) The local maxima describes the mean-shift calculated Current Frame Track Location, and is typically represented by a bounding box. The track information is finally updated with the Current Frame Track Location and the system awaits the next video frame.

The mean-shift algorithm is also able to give an approximate confidence of the determined tracking, by examining the absolute strength of the PDF within the bounding box, penalised by the strength of the PDF in the immediate area outside the bounding box.

The mean-shift tracker has some useful properties. The use of histograms means that the mean-shift tracker is invariant to rotation and (to a lesser degree) scale and deformation of the objects. The mean-shift tracker is also computationally efficient compared with other Visual Signature algorithms.

One limitation of the mean-shift tracker is that the tracked object may gradually change in appearance over a period of time. If updated Exemplar Views for the track are not provided, the track may be lost. Updating the Exemplar View may be done by using mean-shift tracking in conjunction with a Human Body Detection algorithm and a geometric track association algorithm to associate Human Body Detection bounding boxes with existing tracks. Alternately, using only the mean-shift object positions, the Exemplar View Histogram may be updated if the histogram described by the mean-shift calculated object position is sufficiently similar to the Exemplar View Histogram. One such approach uses a threshold for the Bhattacharyya coefficient between the two histograms to decide whether to update the Exemplar View histogram.

A significant limitation of the mean-shift tracker is that if the histogram peaks of an object also appear in nearby background areas of the image, the algorithm can fail to locate the present position of the object, instead including the nearby background areas in its determined location.

A simple way to avoid including background pixels is to centre-weight the histogram data with respect to the bounding box of the Exemplar View. One improvement is to exclude or penalise nearby background areas as defined as the area immediately outside the Exemplar View bounding box or the foreground area associated with the track, when creating histograms and/or back projections. Background exclusion is done only for the Exemplar View and not for subsequent mean-shift generated calculated object positions as errors in the mean-shift generated calculated object position may cause parts of the object to be in the background exclusion area, which in turn can cause larger errors, leading to tracking failure.

Another significant limitation of the mean-shift tracker is that if the object moves to an area of the scene that has a similar background appearance to the object, it is possible the tracker will get stuck on the background area. One approach for addressing this issue dynamically creates a compensated Exemplar View Histogram using the Exemplar View Histogram and a histogram constructed from a bounding box based on the predicted track location, using the ratios of bin sizes to determine whether background areas share features with the Model, and penalising those bins if they do.

A common problem with these methods that create a compensated Exemplar View Histogram by de-emphasising selected Exemplar View Histogram bins is that the mean-shift generated calculated object position may be changed as well. For example, when tracking a person, if the person's trousers are a similar colour to the background, the compensated Exemplar View Histogram may remove that colour, and the subsequent back projection and mean-shift generated calculated object position represents the upper part of the body. The bounding box centroid is modified and (in the case of the CAMShift visual signature algorithm) size is reduced. Only a portion of the object (the upper half) is now being tracked. If a geometric tracker is being used to assist track predictions in future frames, the track prediction will no longer be accurate. It is also easier to lose the track altogether due to the smaller bounding box.

There is a need for a tracker that is more robust to tracking objects when there is visually similar background nearby.

SUMMARY

According to one aspect of the present disclosure, there is provided a method for tracking an object across a number of image frames, the method comprising:
identifying a region containing the object in a first image frame to be stored as an exemplar view of the object;
creating an appearance model based on the region in the first image frame and a background region in a second image frame;
determining at least one of a location and size of a predicted region for tracking the object in the second image frame using the appearance model; and
correcting at least one of the determined location and size of the predicted region in the second image frame in accordance with at least one of the location and size of the region in the first image frame corresponding to the exemplar view of the object.

According to another aspect, there is provided a method for tracking an object across a number of image frames, the method comprising:
identifying a region containing the object in a first image frame to be stored as an exemplar view of the object;
creating an initial appearance model based on the region in the first image frame and a background region in the first image frame; and then for subsequent video frames in a video sequence
determining at least one of a location and size of a predicted region for tracking the object in the subsequent image frame using at least one of the initial appearance model and an updated appearance model;
correcting at least one of the determined location and size of the predicted region in the subsequent image frame in accordance with at least one of the location and size of the region in the first image frame corresponding to the exemplar view of the object; and
creating an updated appearance model.

Desirably the creating of the appearance model comprises:
forming a track prediction for the exemplar view in the second frame;
establishing a predicted background region of the second frame using the track prediction; and
modifying an appearance model of the second frame by reducing features of the appearance model in accordance with their representation in the predicted background region.

Desirably the track prediction consists of a region being identical to the identified region.

Alternatively the track prediction comprises a region with a position and size according to a prediction from prior positions of the track using a Kalman filter.

Typically the appearance model is formed as a dynamic background compensated histogram.

Preferably the appearance model is attenuated based on at least one of: (i) a difference between histogram values; and (ii) a ratio of histogram values.

Preferably the determining of the predicted region comprises: creating a current frame back projection using the modified appearance model; and calculating a track location in the second frame using the back projection and the mean-shift procedure. Preferably a CAMShift procedure is further used to refine the track location in the second frame.

In a specific implementation the correcting comprises: forming an exemplar view back projection using the modified appearance model; calculating the predicted region as an exemplar view track location using the exemplar view back projection; and correcting the track location in the second frame using the exemplar view track location.

Desirably the process of identifying a region and creating an appearance model are performed for multiple image frames, and wherein one or more appearance models are chosen for the process of determining and correcting a predicted region. Typically a corrected prediction region is created from an average of the corrected predicted regions for a subset of the appearance models. In one implementation the subset of the appearance models is the full list of appearance models. In another the subset of the appearance models is chosen according to a metric of similarity between statistics relating to the appearance model and the track prediction. Generally the metric of similarity between the appearance model and the track prediction is similarity of direction of movement. Alternatively the metric of similarity between the appearance model and the track prediction is similarity of position.

In another implementation, the method comprises: forming a geometric track prediction for the object in the second frame; creating a geometric track prediction histogram for the second frame; creating a dynamic background compensated histogram for the second frame using the exemplar view of the object from the first frame; creating a back projection on the second frame using the dynamic background-compensated histogram; calculating a track location in the second frame using the back projection and the mean-shift procedure; creating an exemplar view back projection using the dynamic background-compensated histogram on the exemplar image; calculating an exemplar view track location using the exemplar view back projection; and correcting the track location in the second frame using the exemplar view track location.

Other aspects are also disclosed.

BRIEF DESCRIPTION OF THE DRAWINGS

At least one embodiment of the present invention will now be described with reference to the following drawings, in which:

FIGS. 1A, 1B, 1C and 1D show a sequence of four video frames representing a sample scenario for video tracking;

DETAILED DESCRIPTION INCLUDING BEST MODE

Context

Presently disclosed is a method for improving the ability of a video tracking system to track in the presence of background with similar appearance.

Figure 1A:
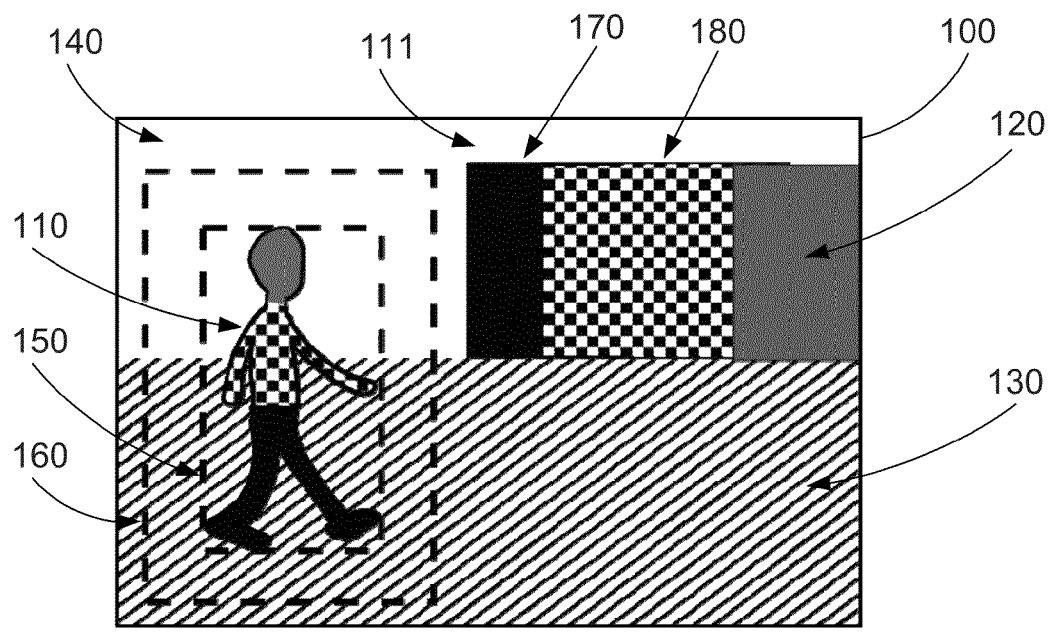

Consider the case of tracking a person using a mean-shift algorithm in the presence of background with similar appearance. FIG. 1A shows a (first) video frame 100, for example captured by one of a number of cameras 1027a-1027c (e.g. 1027a) imaging a scene. The frame 100 contains a representation of a person 110 having a solid grey skin colour wearing black trousers and a checked shirt, walking through the scene that has a ground 130 with a colour represented by a striped pattern, a sky 140 represented by a white colour, and a background building 111 that has three sections 170, 180, and 120 each having a colour the same as the trousers, checked shirt, and skin, respectively. An exemplar bounding box 150 is chosen by a user or another external process such as a Human Body Detection subsystem surrounds the person 110. An exemplar background collection bounding box 160 with the same centroid as the exemplar bounding box 150 but proportionally larger in width and height also surrounds the person 110.

FIG. 1B shows a subsequent (second) frame 101 where the person 110 has moved to the right, generally closer to the building 111.

FIG. 1C shows another subsequent (third) frame 102 in which the person 110 has moved further to the right and is now in front of the section 180 of the building 111.

Figure 1D:
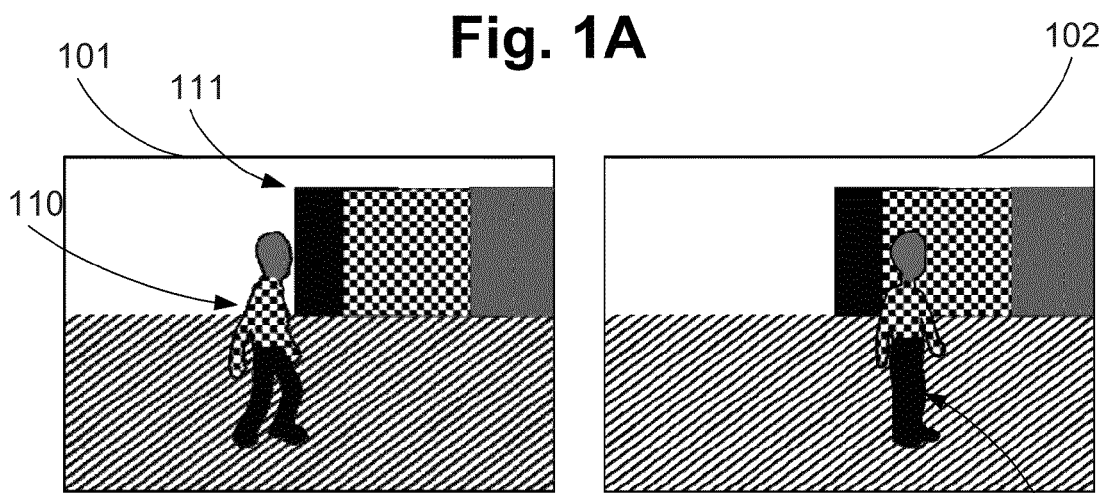
Figure 1D:
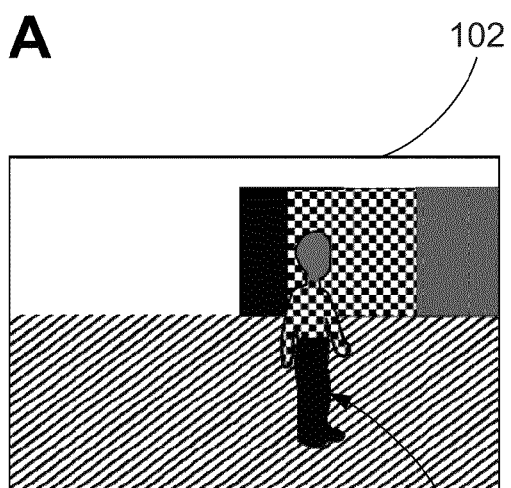
Figure 1D:
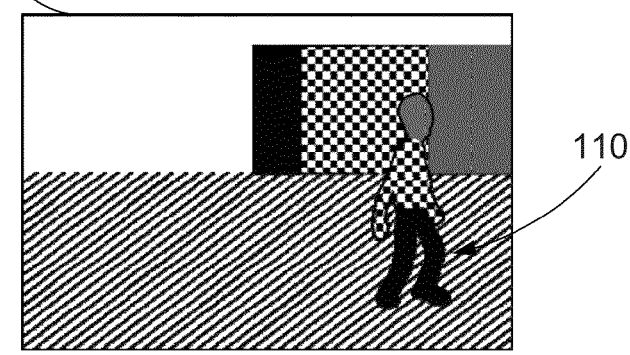

FIG. 1D shows another subsequent (fourth) frame 103 in which the person 110 has moved further to the right and is now in front of the section 120 of the building 111.

The subsequent frames 101, 102, 103 may be frames immediately following the frame 100 such that all four frames are consecutive frame in a video stream. However, in the example illustrated, the subsequent frames 101, 102, 103 are captured by the camera 1027a perhaps at intervals of 1-2 seconds after the frame 100. The frames 100-103 may therefore be consecutively captured or selected frames from a stream of frames captured by the camera 1027a. The tracking arrangements described herein are performed across a number of image frames, being at least two frames and typically more, but not necessarily consecutively captured frames at traditional video frame rates of 25 or 30 frames per second. For surveillance, fixed capture rates may be 1 frame per second, or one frame every 5 seconds. Capture rates need not be uniform, for example, where capture is motion sensitive.

Structural Implementation

Figure 10A:
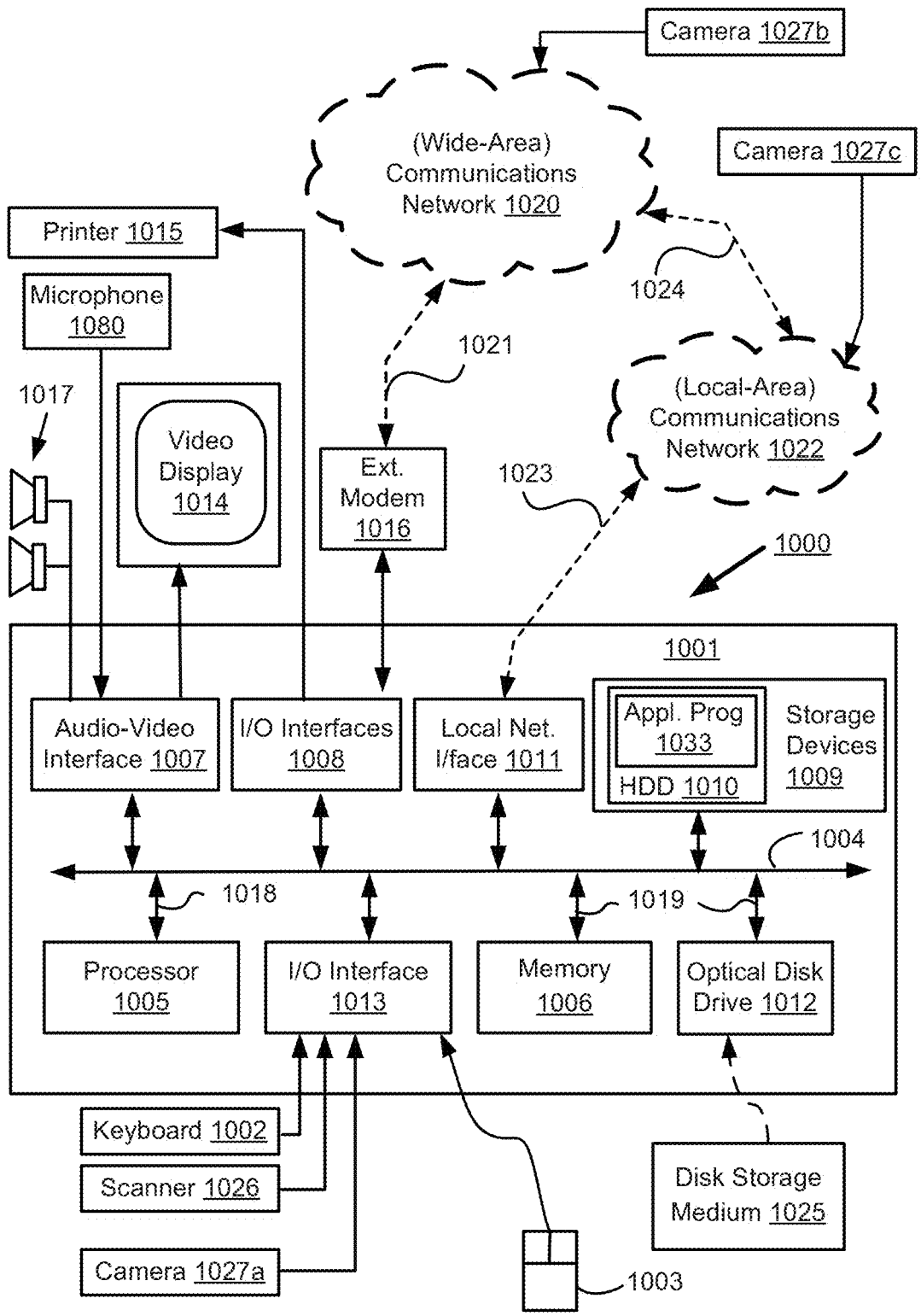
FIGS. 10A and 10B form a schematic block diagram of a general purpose computer system upon which arrangements described can be practiced.
Figure 10B:
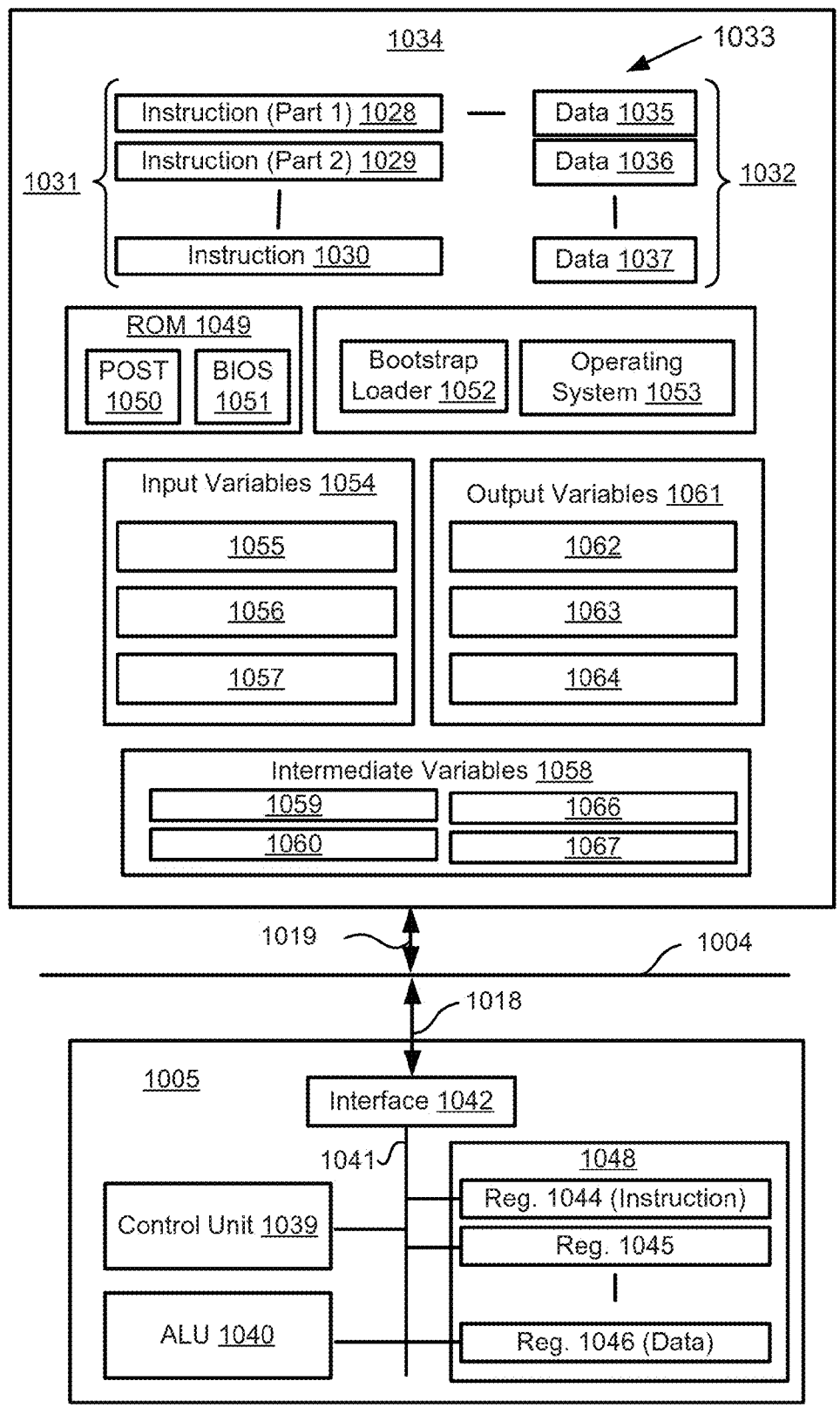

FIGS. 10A and 10B depict a general-purpose computer system 1000, upon which the various arrangements described can be practiced. In this specific implementation, the system 1000 is configured as a video surveillance system by virtue of the presence and operation of a number of video cameras 1027a, 1027b and 1027c.

As seen in FIG. 10A, the computer system 1000 includes: a computer module 1001; input devices such as a keyboard 1002, a mouse pointer device 1003, a scanner 1026, the video camera 1027a, and a microphone 1080; and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 1027a and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 1000 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet circuit card, a Bluetooth™ wireless arrangement or an IEEE 802.11 wireless arrangement; however, numerous other types of interfaces may be practiced for the interface 1011.

As illustrated in FIG. 10A, the video camera 1027b is coupled to the WAN/Internet 1020 and the video camera 1027c is coupled to the LAN 1022 by which each, together with the directly coupled video camera 1027a, may provide a stream or sequence of video frames that may be used for a variety of purposes including surveillance, for example for security or behavioural analysis purposes. The arrangements presently disclosed are focussed upon processing of video data received from any one camera 1027, although such may be adapted for operations using input video streams received from a number of cameras.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1000.

The components 1005 to 1013 of the computer module 1001 typically communicate via an interconnected bus 1004 and in a manner that results in a conventional mode of operation of the computer system 1000 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or a like computer systems.

The method of video processing including object tracking may be implemented using the computer system 1000 wherein the processes of FIGS. 2 to 9, to be described, may be implemented as one or more software application programs 1033 executable within the computer system 1000. In particular, the steps of the method of object tracking are effected by instructions 1031 (see FIG. 10B) in the software 1033 that are carried out within the computer system 1000. The software instructions 1031 may be formed as one or more code modules, each for performing one or more particular tasks. The software may also be divided into two separate parts, in which a first part and the corresponding code modules performs the object tracking methods and a second part and the corresponding code modules manage a user interface between the first part and the user.

The software may be stored in a computer readable medium, including the storage devices described below, for example. The software is loaded into the computer system 1000 from the computer readable medium, and then executed by the computer system 1000. A computer readable medium having such software or computer program recorded on the computer readable medium is a computer program product. The use of the computer program product in the computer system 1000 preferably effects an advantageous apparatus for video object tracking.

The software 1033 is typically stored in the HDD 1010 or the memory 1006. The software is loaded into the computer system 1000 from a computer readable medium, and executed by the computer system 1000. Thus, for example, the software 1033 may be stored on an optically readable disk storage medium (e.g., CD-ROM) 1025 that is read by the optical disk drive 1012. A computer readable medium having such software or computer program recorded on it is a computer program product. The use of the computer program product in the computer system 1000 preferably effects an apparatus for video object tracking.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the computer system 1000 from other computer readable media. Computer readable storage media refers to any non-transitory tangible storage medium that provides recorded instructions and/or data to the computer system 1000 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014.

Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1409, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1409, 1006) to ensure that each process or application running on the computer module 1001 has sufficient memory in which to execute without colliding with memory allocated to another process. Furthermore, the different types of memory available in the system 1000 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1430, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1005 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The disclosed object tracking arrangements use input variables 1054, which are stored in the memory 1034 in corresponding memory locations 1055, 1056, 1057. The arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

(i) a fetch operation, which fetches or reads an instruction 1031 from a memory location 1028, 1029, 1030;

(ii) a decode operation in which the control unit 1039 determines which instruction has been fetched; and (iii) an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 2 to 9 is associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The methods of video object tracking disclosed herein may alternatively be implemented in dedicated hardware such as one or more integrated circuits performing the functions or sub functions of video processing. Such dedicated hardware may include graphic processors, digital signal processors, ASICs, FPGAs or one or more microprocessors and associated memories. Such dedicated hardware may for example be incorporated into embedded devices formed within one or more of the cameras 1027*a*-1027*c* to thereby afford a video object tracking ability to the respective camera which can then output, as desired, specific tracking data of objects meeting certain tracking criteria. Such an implementation has application where large scale surveillance operations may be undertaken to identify particular actions or situations, for example in airports, train stations, sporting arena, casinos and the like.

Implementation

Figure 7:
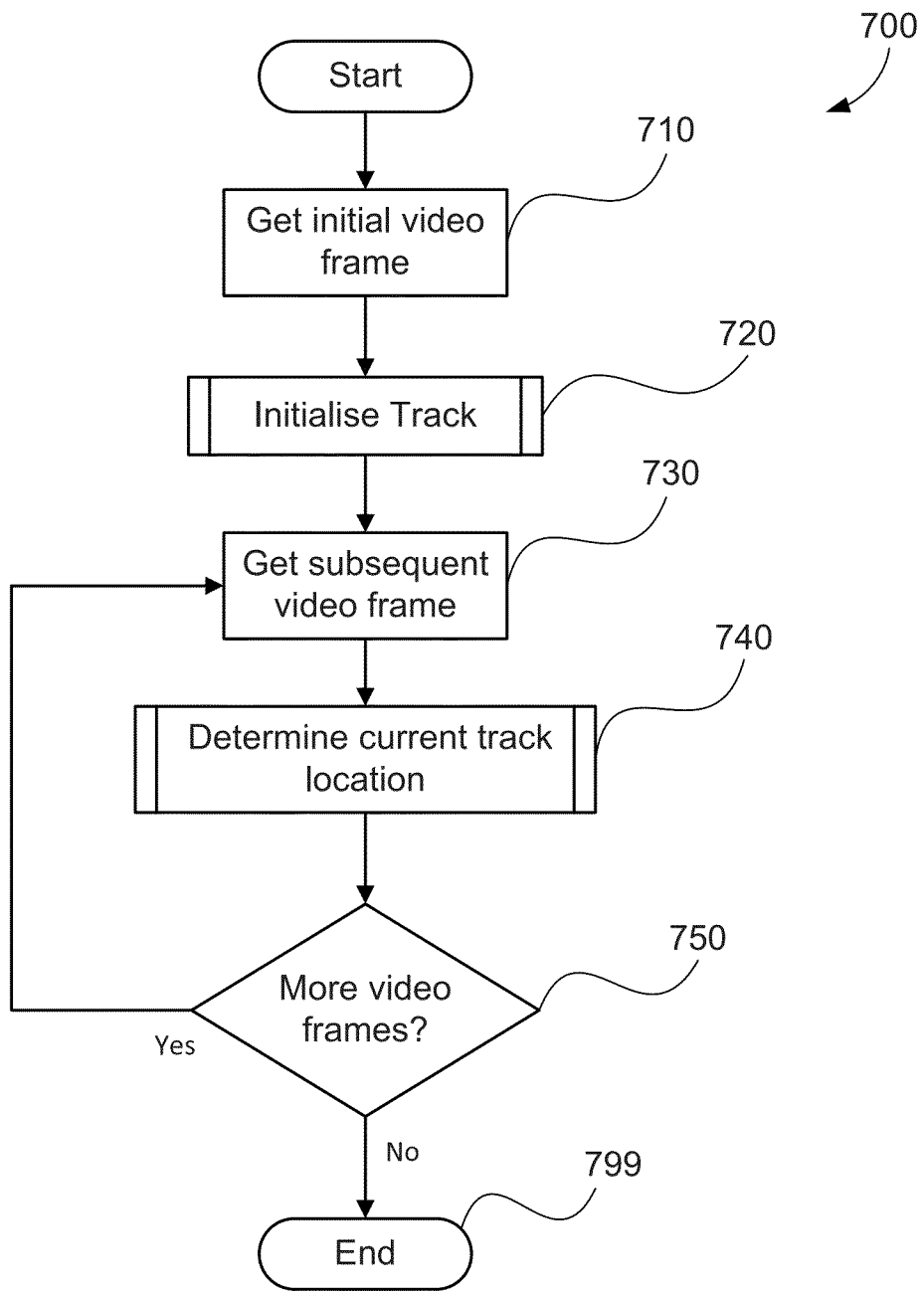
FIG. 7 shows a flow chart for a video object tracker.

In a preferred implementation, a preferred video object tracker according to the present disclosure is implemented as a software application, for example stored on the HDD 1010 and executable by the processor 1005, to perform a method 700 as described in FIG. 7. Not illustrated in the method 700 are preliminary steps of receiving captured video frames from a camera 1027 and storing video data for each frame in the memory 1006 and/or HDD 1010 whereupon various video processing applications, including the method 700, may operate on the stored frame data. The method 700 describes the process for tracking a single object in a video sequence. The method starts at a step 710 whereby the processor 1005 retrieves a frame of video from the memory 1006.

The method 700 then in step 720 initialises a track. Step 720 is described in further detail with reference to FIG. 8.

In step 730, the processor 1005 gets a subsequent video frame in the video sequence, for example from the memory 1006/1010. This could be the next video frame captured by the system 1000, or some later video frame.

In step 740, the processor 1005 is operated to determine the current location of the track. Step 740 is described in further detail in FIG. 9.

In step 750, the processor 1005 determines if there are any more frames to be processed, in which case the method 700 returns to step 730 to retrieve the next video frame 730 from the memory 1006, or proceeds to step 799 if there are no further video frames to analyse, whereupon the method 700 ends.

Figure 8:
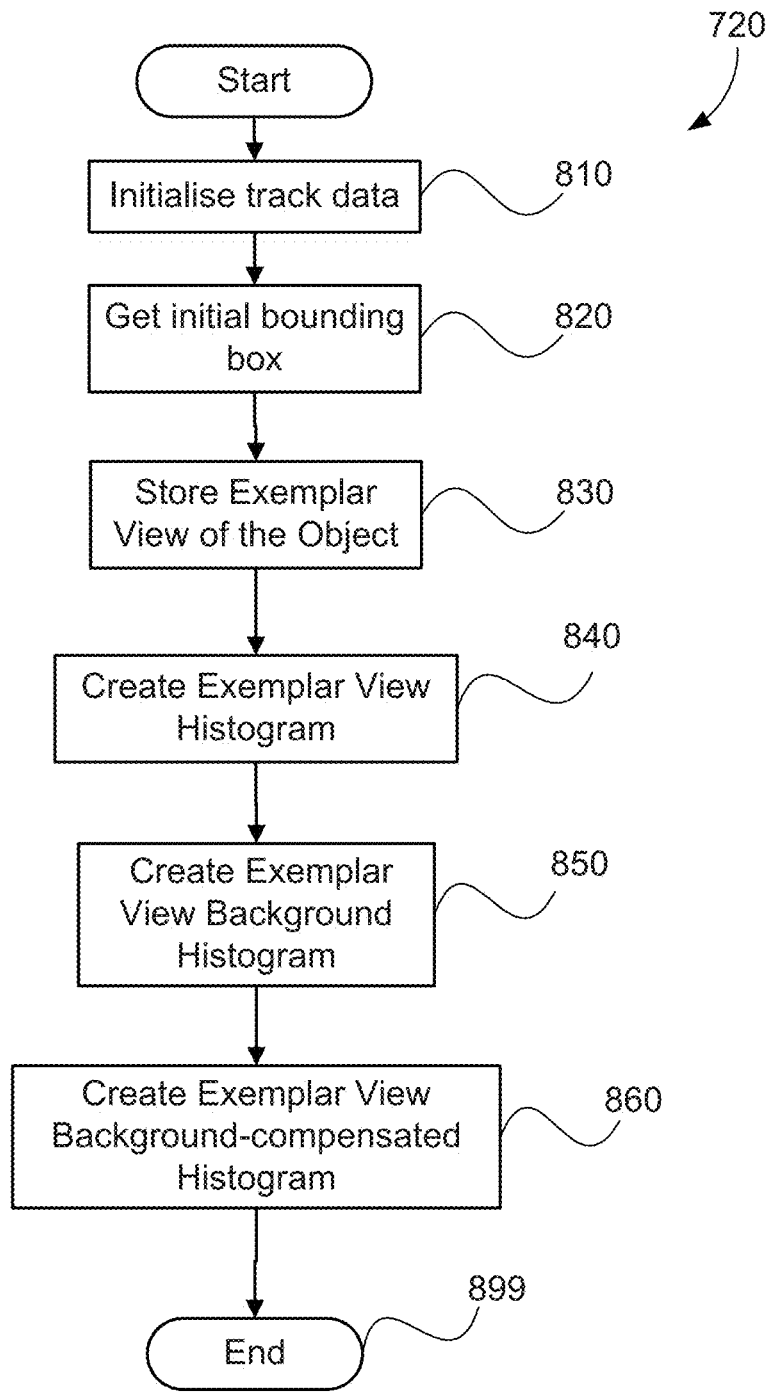
FIG. 8 shows a flow chart for a subsection of FIG. 7, describing the initialisation of a visual signature tracker.

A subsystem of the video object tracker operative for step 720 for initialising the track is described in further detail in FIG. 8. The subsystem for step 720 starts with a step 810 where the processor 1005 initialises a structure containing data for the object to be tracked. The structure is preferably formed of a Track Position List and an Exemplar View List and is typically stored temporarily in the memory 1006 for ready access during processing. The Track Position List is a list of positions of Exemplar View bounding boxes $b_S$ described later in step 820, and corrected track bounding boxes $b_C$ described later in step 980, each with a reference to the associated video frame. The Exemplar View List includes a list of Exemplar Views. Each Exemplar View has an Exemplar View bounding box $b_S$ described later in step 820, an Exemplar View of the Object described later in step 830, and an Exemplar View Background-Compensated Histogram described later in step 860.

The subsystem then in step 820 obtains the initial bounding box indicated by a transpose vector $b_S = (x_S, y_S, w_S, h_S)^T$ describing the object to be tracked in the initial video frame 710, where x and y are the centre positions of the bounding box, and w and h are the width and height of size of the bounding box. This initial bounding box $b_S$ may be manually chosen by a user of the system 1000, for example using the computer mouse 1003 to select the top left and bottom right of the bounding box area of the frame as reproduced via a GUI on the display 1014. Alternately, the bounding box $b_S$ may be created by an external subsystem such as a Foreground Detection subsystem, or a Human Body Detection subsystem, or any of the many frame-based video object detection methods known in the art. Such external subsystems may similarly be software applications loaded to and executable upon the computer module 1001. For the purposes of this description, the bounding box is a rectangle, but the bounding box chosen may be a square, oval, or other shape enclosing the object to be tracked. In a further alternative, a Foreground Separation algorithm may be used to create an irregular-shaped bounding box tightly enclosing the contours of the object in the frame. The position and size of the initial bounding box $b_S$ is then stored in the memory 1006 in the track data in the Track Position List, along with a reference to the initial video frame selected at step 710 for which the bounding box was provided. The initial bounding box $b_S$ is also stored in the last member of the Exemplar View List.

As an example of the preferred implementation, an initial bounding box for the first video frame 100 as illustrated in FIG. 1A may be the aforementioned exemplar bounding box 150.

Once the initial bounding box $b_S$ has been set, the subsystem 720 in step 830 stores an Exemplar View of the Object as the last member of the Exemplar View List. This Exemplar View of the object corresponds to the pixels inside the bounding box obtained in step 820 of the initial video frame 100 selected at step 710.

The subsystem 720 then in step 840 creates an Exemplar View Histogram $\{H_u^E\}_{u=1\ldots m}$, where m is the number of bins of the Histogram. The process of creating a histogram from an image region is well-known in the art, but will be briefly summarised here. A histogram consists of an array of unsigned integers each called a "bin", each initialised to zero. For each pixel $p_{x,y}$ in the image region, a function $u = f_{HIST})p_{x,y}$) is used to determine the corresponding histogram bin u. That histogram bin is then incremented. The function $f_{HIST}()$ is dependent on the histogram type and total number of bins. In a preferred implementation the histogram is a three dimensional histogram in the colour space YCbCr, with a histogram bin sizes of $Y_{bin}=8$, $Cb_{bin}=8$, $Cr_{bin}=8$. If $p_{x,y}=(Y, C_b, C_r)$ with each value Y, $C_b$, $C_r$ being in the range [0 . . . 255], then $$f_{HIST}(p_{x,y}) = Cb_{bin} \times Cr_{bin} \times \text{floor}\left(\frac{Y \times Y_{bin}}{255}\right) + Cr_{bin} \times \text{floor}\left(\frac{Cb \times Cb_{bin}}{255}\right) + \text{floor}\left(\frac{Cr \times Cr_{bin}}{255}\right)$$

In an alternate implementation the histogram is a one dimensional histogram using Hue, and uses thresholds to exclude visual elements that have low saturation or value. In a further alternate implementation the histogram is a three dimensional histogram in the colour space RGB. The Exemplar View Histogram is an example of an appearance model based on the appearance features (e.g. colours) that are present in the object as represented by the image region.

Figure 2A:
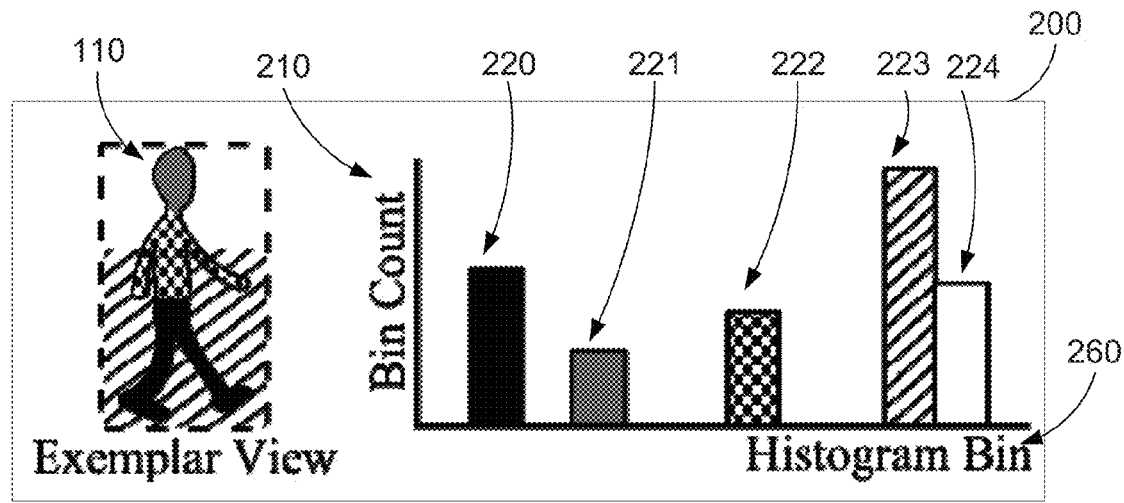
FIGS. 2A, 2B and 2C show histograms illustrating background compensation for a region of the first video frame, being that of FIG. 1A.

As an example of the preferred implementation, a bar chart illustrating an Exemplar View Histogram $\{H_u^E\}_{u=1\ldots m}$ 200 is shown in FIG. 2A. To the left, the Exemplar View 150 of the Object 110 is shown. To the right is a bar chart with bin count 210 along the vertical axis and the Histogram Bin index u 260 shown on the horizontal axis. Vertical rectangles indicate the strengths of the colours in the Exemplar View of the Object, the strengths being representative of the number of pixels within the histogram bin of that colour within the Exemplar View. The black bar 220 indicates the trousers of the person being tracked; the grey bar 221 indicates the head; the checked bar 222 indicates the shirt; the striped bar 223 indicates the floor area of the background; and the white bar 224 indicates the white sky area of the background.

The subsystem 720 then in step 850 creates an Exemplar View Background Histogram $\{H_u^B\}_{u=1\ldots m}$. The Exemplar View Background Histogram consists of a histogram of the pixels in the Exemplar View Background Region, the region between an outer bounding box $b_o = (x_S, y_S, w_S \times \delta, h_S \times \delta)^T$ and the initial bounding box $b_S$, where the outer bounding box $b_o$ has the same centre position and aspect ratio as the initial bounding box, but with width and height larger by the proportion $\delta$, which is typically pre-set by the user. The histogram type, dimensions, and bin sizes of the Exemplar View Background Histogram are the same as used in the Exemplar View Histogram in step 840. In a preferred implementation, $\delta=2$. The Exemplar View Background Region outer bounding box may extend outside the current image frame, and pixels outside the current image frame are ignored for the purpose of histogram creation.

Figure 2B:
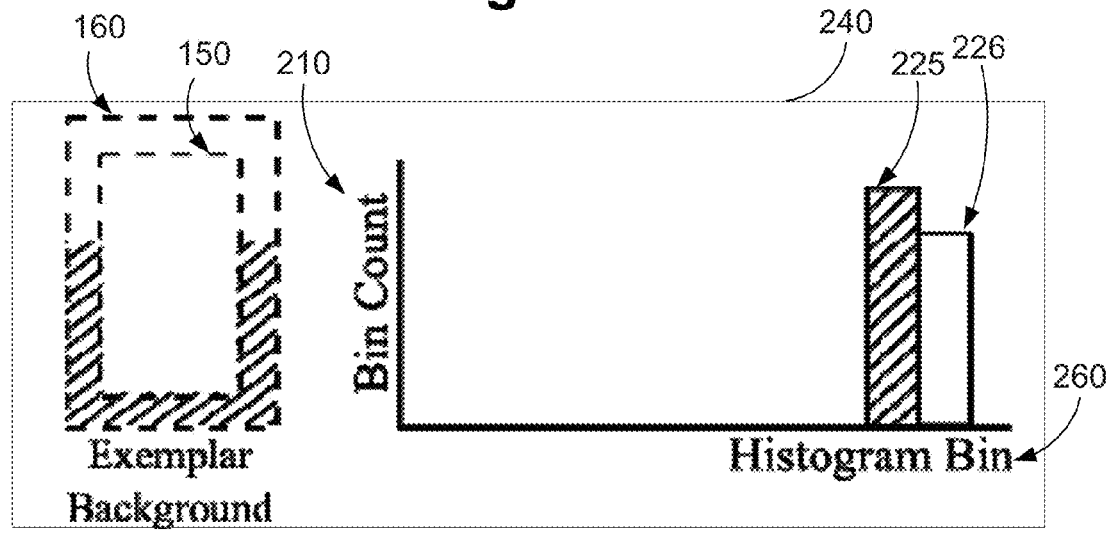

As an example of the preferred implementation, a bar chart illustrating the Exemplar View Background Histogram $\{H_u^B\}_{u=1\ldots m}$ 240 is shown in FIG. 2B. The Exemplar View Background Region is shown as the area between the initial bounding box $b_S$ 150 and the outer bounding box $b_o$ 160. The histogram bin values for the ground 225 and sky 226 are shown on the histogram.

The subsystem 720 then in step 860 creates an Exemplar View Background-compensated Histogram $\{H_u^C\}_{u=1\ldots m}$. The intent is to remove the effects of pixels inside the initial bounding box that do not correspond to the object. There are many methods for background removal known in the art. In a preferred implementation the Exemplar View Background-compensated Histogram is created by, for each bin of the Exemplar View Histogram, attenuating the contribution by subtracting the value of the corresponding bin of the Exemplar View Background Histogram divided by a scaling factor $\beta$. If the calculated bin value would be less than zero, then the bin value is set to zero. A formula expressing this calculation is:

$$\left\{H_u^C = \max\left(H_u^E - \frac{H_u^B}{\beta}, 0\right)\right\}_{u=1\ldots m}$$

In a preferred implementation a specific attenuating scaling factor $\beta$ is used, where $$\beta = \frac{\sum_{u=1}^{m} H_u^B}{\sum_{u=1}^{m} H_u^E},$$

the ratio of the total bin count of the Exemplar View Background Histogram $H_u^B$ to the total bin count of the Exemplar View Histogram H. Other methods known in the art include the CAMshift method whereby each bin value of the Exemplar View Histogram is divided by the corresponding bin value of the Exemplar View Background Histogram, and then multiplied by the minimum non-zero value of the Exemplar View Background Histogram. The Exemplar View Background-compensated Histogram is stored in the last member of the Exemplar View List and is used for correcting the track location.

Figure 2C:
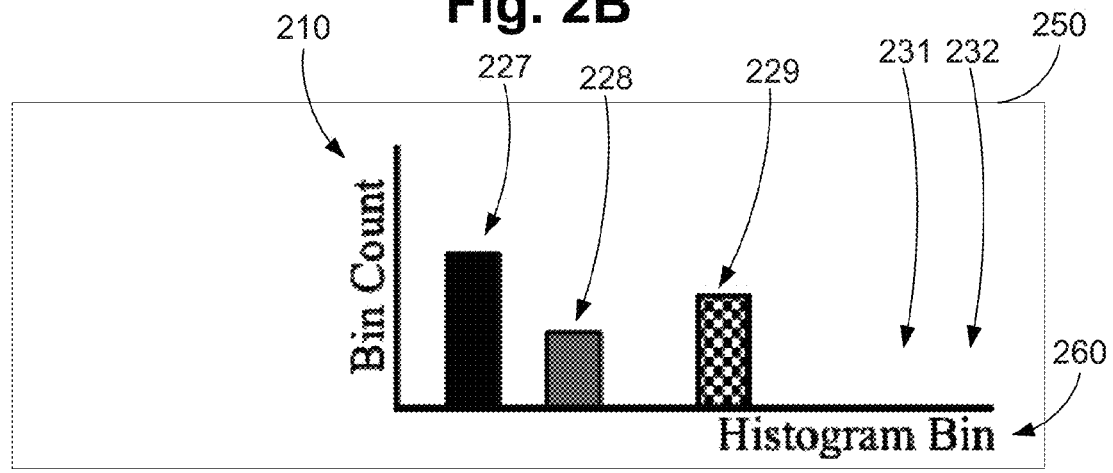

As an example of the preferred implementation, a bar chart illustrating the Exemplar View Background-compensated Histogram $\{H_u^C\}_{u=1 \ldots m}$ 250 is shown in FIG. 2C. The histogram 250 represents a compensated appearance model for the first frame 100, and shows that the histogram bin values for the trousers of the person being tracked 227, the head 228, and the shirt 229 are unchanged due to their lack of presence in the Exemplar View Background Histogram 240, whereas the ground 231 and sky 232 values have dropped to zero as a result of their strengths 225, 226 in the Exemplar View Background Histogram 240.

The process 720 then concludes at step 899.

Figure 9:
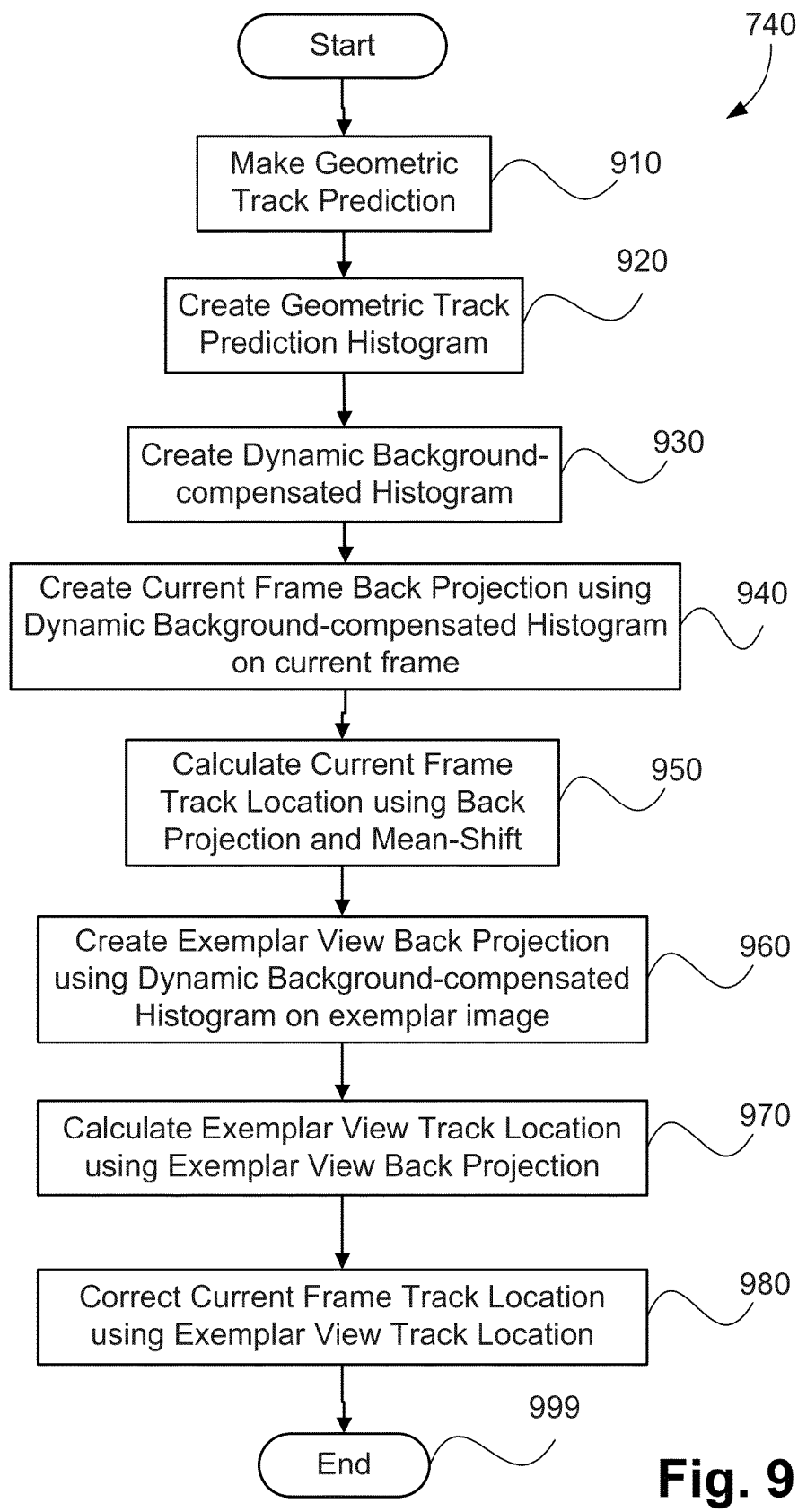
FIG. 9 shows a flow chart for a subsection of FIG. 7, describing the process by which a visual signature tracker locates the bounding box for a track in a video frame.

A subsystem of the tracker method 700 operative for step 740, for determining the current track location, is described in further detail in FIG. 9. The subsystem 740 starts with a step 910 which makes a Geometric Track Prediction $b_P$. For the processing of a first subsequent video frame obtained at step 730 after the initial frame, the Track Position List of the track data includes only the initial bounding box $b_S$ obtained at step 820. The predicted track position is simply equal to the initial bounding box $b_S$. However, for the processing of subsequent video frames it is possible to make predictions based on the Track Position List. In the preferred implementation, the method in step 910 uses a Kalman filter and the Track Position List to make predictions of track bounding box position and size, and to estimate velocity and acceleration of the object in each video frame.

Figure 3A:
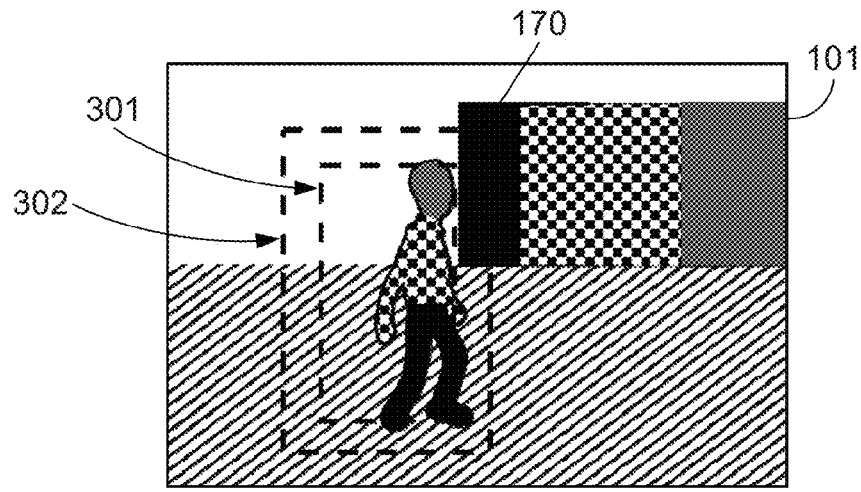
FIGS. 3A, 3B and 3C show the video frame, predicted bounding box, and histograms illustrating dynamic background compensation for a region of the second video frame, being that of FIG. 1B.

As an example of the preferred implementation, FIG. 3A shows the second video frame 101 shown in FIG. 1A with a predicted track position ((x, y) and size (width, height)), represented by a bounding box $b_P$ 301, which may be referred to as the Geometric Track Prediction bounding box. For the purposes of illustration, the predicted track position is indicated by the bounding box $b_P$ 301 of FIG. 3A and is to the right of the initial bounding box $b_S$ 150 of FIG. 1A. This can happen in cases in which velocity information is provided with the initial bounding box, or where there are successfully tracked intermediate frames.

The tracker method 700 then in step 920 creates a Geometric Track Prediction Histogram $\{H_u^G\}_{u=1 \ldots m}$ using the pixels of the current video frame 101 as obtained in step 730 within the Geometric Track Prediction bounding box $b_P$ as determined in step 910. The histogram type, dimensions, and bin sizes of the Geometric Track Prediction Histogram are the same as the Exemplar View Histogram determined in step 840. In the preferred implementation a corresponding Expanded Geometric Track Prediction bounding box $b_{p2}$ 302 is used to create the histogram and is a bounding box with the same centre position as the Geometric Track Prediction bounding box $b_P$ 301 but width and height multiplied by a constant, for example, $b_{p2}=(x_S, y_S, w_S \times 1.5, h_S \times 1.5)^T$. This expanded bounding box $b_{p2}$ 302 is used to ensure nearby background is adequately compensated for and to ensure movement of the tracked object does not result in the tracked object being outside the bounding box.

Figure 3B:
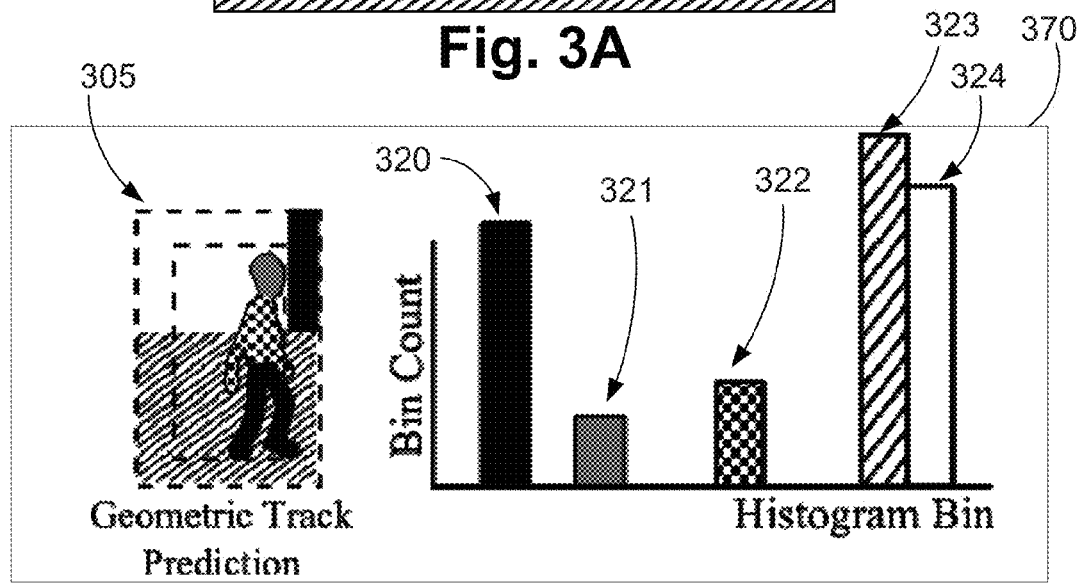

As an example of the preferred implementation, the expanded bounding box $b_{p2}$ 302 is shown in FIG. 3A. FIG. 3B shows a histogram $\{H_u^G\}_{u=1 \ldots m}$ 370 corresponding to the region 305 enclosed in the bounding box $b_{p2}$ 302. The histogram strength for the black bar 320 is stronger than that of the corresponding Exemplar View Background-Compensated Histogram $\{H_u^C\}_{u=1 \ldots m}$ bin value 227 due to the presence of the black area of the background building 170. The values 321 and 322 of the face and shirt respectively are substantially similar, and the background floor 323 and sky 324 are also increased due to the larger size of the bounding box $b_{p2}$ 302.

The tracker method 700 then in step 930 creates an correcting Dynamic Background-Compensated Histogram $\{H_u^D\}_{u=1 \ldots m}$ by attenuation by subtracting from each histogram bin u of the Exemplar View Background-compensated Histogram $\{H_u^C\}_{u=1 \ldots m}$ 250 created in step 860 the difference between (i) the Geometric Track Prediction Histogram created in step 920 for that bin u multiplied by a scaling factor alpha, and (ii) the Exemplar View Background-compensated Histogram $\{H_u^C\}_{u=1 \ldots m}$ for that bin u. This may be expressed using the formula:

$$\left\{ H_u^D = \max\left( H_u^C - \tau\left(\frac{H_u^G}{\alpha} - H_u^C\right), 0 \right) \right\}_{u=1 \ldots m}$$

In this formula, the scaling factor $\alpha$ is the area of the Geometric Track Prediction bounding box divided by the area of the Exemplar View bounding box, and the scaling factor $\tau$ is a user-defined constant configured to further penalise areas of the object common to the background without further increasing the size of the expanded Geometric Track Prediction bounding box $b_{p2}$ 302. In the preferred implementation $\tau=2$. The scaling factor a is intended to correct for changes to the size of the object as the object moves around within the scene, compared with the exemplar view of the object.

In an alternate implementation, the formula for creating the Dynamic Background-Compensated Histogram $\{H_u^{D2}\}_{u=1 \ldots m}$ is instead produced by multiplying each histogram bin u of the Exemplar View Background-compensated Histogram by the ratio between the Exemplar View Background-compensated Histogram bin value and the corresponding Geometric Track Prediction Histogram value. If the corresponding Geometric Track Prediction Histogram value is zero, the histogram bin value is simply a copy of the corresponding bin of the Exemplar View Background-compensated Histogram. This may be expressed using the formula:

$$H_u^{D2} = \begin{cases} H_u^C & \text{if } H_u^G \text{ is } 0 \\ H_u^C \times \dfrac{H_u^C}{H_u^G} & \text{otherwise} \end{cases}$$

Thus, by examining the differences between the Geometric Track Prediction Histogram and the Exemplar View Background-compensated Histogram it is possible to determine whether there are background features in the scene that are similar to features of the object being tracked, and to compensate for those background features by penalising or attenuating histogram bins that have those features.

Figure 3C:
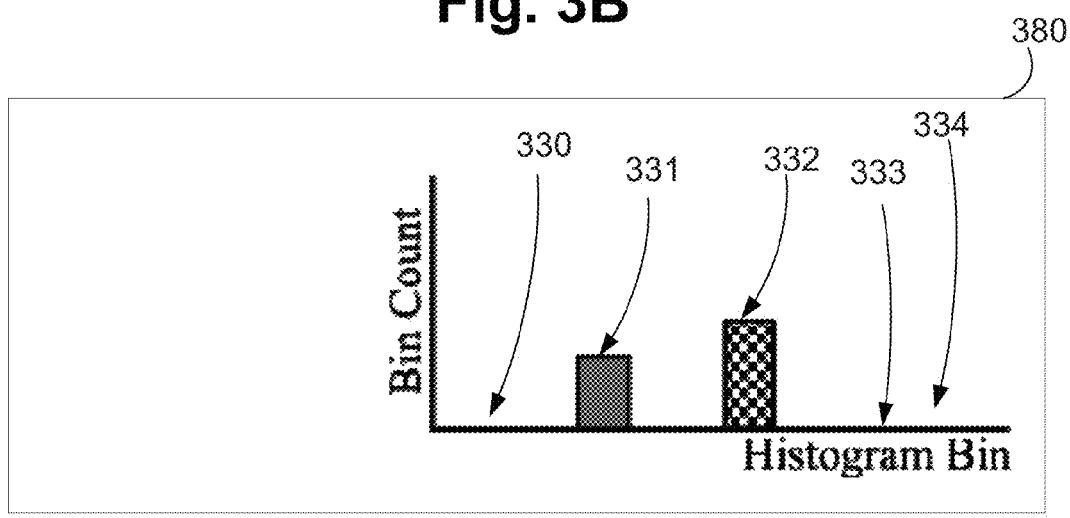

As an example of a Dynamic Background-Compensated Histogram $\{H_u^D\}_{u=1\ldots m}$, FIG. 3C shows the effect of subtracting the scaled Geometric Track Prediction Histogram 370 (FIG. 3B) from the Exemplar View Background-compensated Histogram 250 (FIG. 2C), being the previous compensated appearance model. The bin 330 representing the trousers and left-side background building has been reduced to zero, while the grey bin 331 and the checked bin 332 are essentially unchanged. The floor bin 333 and sky bin 334 remain zero. The histogram 380 of FIG. 3C represents a modified appearance model that is formed using the exemplar image 150 derived from the first frame 100 and its associated track prediction 302/305, and the background region, notably the influence of the building section 170 and the corresponding histogram bar 320, of the second frame 101.

The tracker method 700 then in step 940 creates a Current Frame Back Projection $B_{x,y}^i$ using the Dynamic Background-compensated Histogram $\{H_u^D\}_{u=1\ldots m}$ shown in FIG. 3C applied to the current video frame obtained in step 730. The method of creating a back projection is well-known in the art but will be summarised here. A back projection is a probability distribution map assigning a probability to each pixel of the current video frame. For each pixel $p_{x,y}$, the histogram bin corresponding to the pixel value is determined using $u=f_{HIST}(p_{x,y})$ The probability is set to the histogram bin value divided by the total of all the bin values of that histogram. In this case, the probability assigned to each pixel of a frame under consideration is $$BP_{x,y} = \frac{H_{f_{HIST}(p_{x,y})}^D}{\sum_{u=1}^{m} H_u^D},$$

being the back projection (probability density map) for a pixel in the current frame. In an alternate implementation the probability is instead set to the histogram bin value divided by the maximum of the bin values of that histogram, i.e.:

$$BP_{x,y} = \frac{H_{f_{HIST}(p_{x,y})}^D}{\max(H_u^D)}.$$

Figure 4A:
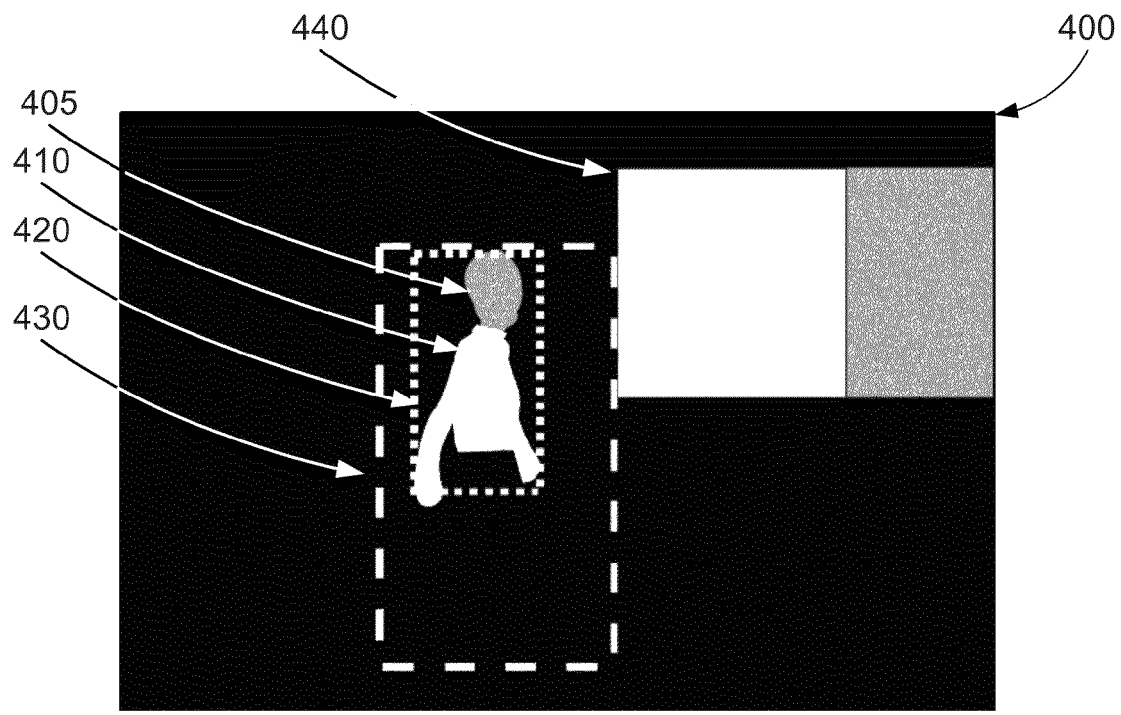
FIGS. 4A and 4B show back projections constructed using the dynamic background compensated histogram, of the scene in the second frame and of a selected region of the first frame respectively, illustrating the utility of bounding box correction.

FIG. 4A shows an example of the Current Frame Back Projection $B_{x,y}^i$ 400. The person's shirt 410 is the strongest values 332 in the histogram 380 of FIG. 3C and so shows up with the greatest probability, as represented by a white area in the back projection 400. A part 440 of the background building 111 that is the same colour as the shirt 410 also shows up strongest with a white area. The person's head 405 and right side 440 of the building also show up, but with a lesser probability, indicated by grey shading. Those areas with least probability, being true background and the person's trousers, are indicated by black shading.

The tracker method 700 then in step 950 uses the mean-shift procedure to calculate the Current Frame Track Location $b_i$. The mean-shift procedure is well-known in the art but will be briefly summarised here. The mean-shift procedure is an iterated movement of a search bounding box to find a local maximum of the values of the back projection within the search bounding box. The movement of the search bounding box at each iteration is determined by the zero'th and first moments of the back projection probability distribution within the search bounding box. The procedure concludes when the movement between iterations is sufficiently small, or when a set number of iterations have been reached. The final position of the search bounding box is the Current Frame Track Location $b_i$. In the preferred implementation the search bounding box is initialised to be the Geometric Track Prediction bounding box $b_p$, and the back projection used is the Current Frame Back Projection $B_{x,y}^i$ generated in step 940.

In the preferred implementation a further refinement of the mean-shift procedure, being the CAMShift procedure, is used to rescale the bounding box $b_i$ preserving the aspect ratio of the bounding box $b_i$, according to the strength of the zero'th moment $m_0$ of the back projection within the Current Frame Track Location $b_i = (x_i, y_i, w_i, h_i)^T$. The moment $m_0$ may be determined according to:

$$m_0 = \sum_{x=x_i-w_i/2}^{x_i+w_i/2} \sum_{y=y_i-h_i/2}^{y_i+h_i/2} B_{x,y}^i$$

The CAMShift resized bounding box is defined by:

$$w_{i2} = \varphi\sqrt{\frac{m_0 h_i}{w_i}}$$

$$h_{i2} = \frac{w_{i2} h_i}{w_i}$$

$$b_{i2} = (x_{i2}, y_{i2}, w_{i2}, h_{i2}) x_{i2} = x_{i1}, y_{i2} = y_{i1}$$

where $\phi$ is a user-defined constant scaling factor. In the preferred implementation, $\phi=2$.

In an alternate implementation the CAMShift procedure makes use of the strength of the zero'th, first, and second moments of the back projection within the Current Frame Track Location, in order to calculate the optimal region size and shape, not requiring the region to have the same aspect ratio as the initial bounding box $b_S$.

CAMShift resizing is done to account for changes in the perceived object size in the video sequence due to perspective.

The bounding box 420 in FIG. 4A illustrates the Current Frame Track Location $b_{i2}$ of the mean-shift and CAMShift procedure. The bounding box 420 is smaller than the previous frame's bounding box (the initial bounding box, $b_S$ 150 shown in FIG. 1A) due to the removal of the black bin 330 from the histogram, which would otherwise have caused the mean-shift procedure problems due to the proximity of the black area 170 of the background building 111.

The tracker method 700 then in step 960 creates an Exemplar View Back Projection $B_{x,y}^E$ using the Dynamic Background-compensated Histogram $\{H_u^D\}_{u=1\ldots m}$ applied to the Exemplar View of the Object 830 stored in the track data in the memory 1006.

Figure 4B:
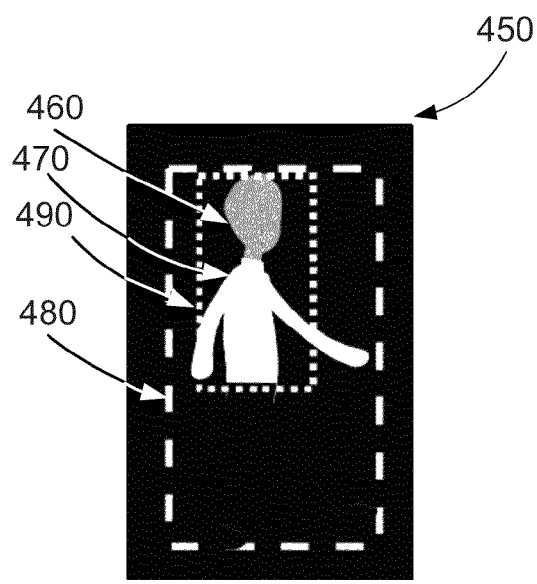

FIG. 4B illustrates an Exemplar View Back Projection $B_{x,y}^E$ 450. The bounding box 480 represents the initial bounding box $b_S$ 150 shown in FIG. 1A. The shirt 470 is strongest in this back projection, and the face 460 is less strong. The background sky 100 and floor 130 are not present in the back projection due to background compensation, and the trousers are not present due to dynamic background compensation.

The tracker method 700 then in step 970 calculates the Exemplar View Track Location by applying a single iteration of the mean-shift procedure to the Exemplar View Back Projection $B_{x,y}^E$ 450, with a starting search bounding box consisting of the Exemplar View bounding box $b_E$. CAMShift resizing is then done to obtain the current Exemplar View Track Location $b_T$.

An Exemplar View Track Location $b_T$ 490 is illustrated as a bounding box in FIG. 4B. This bounding box is smaller than the initial bounding box $b_S$ due to the removal of the black bin 330 from the histogram, in a similar fashion to the reduction in size of the Current Frame Track Location $b_{i2}$ 420 of FIG. 4A. Note that in FIG. 4B parts of the person's shirt 470 are outside the Exemplar View Track Location $b_T$. It is possible in the CAMShift resizing to have parts of the probability distribution outside the calculated bounding box $b_T$, particularly when the bounding box aspect ratio is fixed to be the same as the initial bounding box 480 aspect ratio.

The tracker then in step 980 creates a Corrected Current Frame Track Location, represented by a bounding box $b_c$ ($w_c$, $h_c$, $x_c$, $y_c$) using the Exemplar View Track Location $b_E$ 480, represented by a bounding box $b_E$ ($w_E$, $h_E$, $x_E$, $y_E$), the current Exemplar View Track Location $b_T$, represented by a bounding box $b_T$ ($w_T$, $h_T$, $x_T$, $y_T$), and the current Frame Track Location $b_{i2}$, represented by a bounding box $b_{i2}$($x_{i2}$, $y_{i2}$, $w_{i2}$, $h_{i2}$) according to the formula:

$$w_c = \frac{w_E w_{i2}}{w_T}$$

$$h_c = \frac{h_E h_{i2}}{h_T}$$

$$x_c = x_{i2} + (x_E - x_T) w_c$$

$$y_c = y_{i2} + (y_E - y_T) h_c.$$

The tracker thus in step 980 attempts to compensate for the changes that have occurred to the Current Frame Track Location $b_{i2}$ 420 as a result of using the Dynamic Background-compensated Histogram, by analysing what the track would look like, being the Exemplar View Track Location $b_T$, if the tracker had been tracking the Exemplar View of the Object. The location (position and size) of the corrected track bounding box $b_c$ is then stored in the Track Position List in the memory 1006 in the track data along with a reference to the frame obtained at step 730 for which the bounding box was calculated.

The corrected bounding box $b_c$ 430 in FIG. 4A is an illustration of bounding box resizing. It is essentially a projection of what the initial bounding box 480 would look like on the current frame 400 if the Current Frame Track Location $b_{i2}$ 420 were the same as the Exemplar View Track Location $b_T$ 490, seen in FIG. 4B.

The utility of bounding box correction may be further appreciated by examining the next two frames of the video sequence of FIGS. 1A to 1D.

Figure 5A:
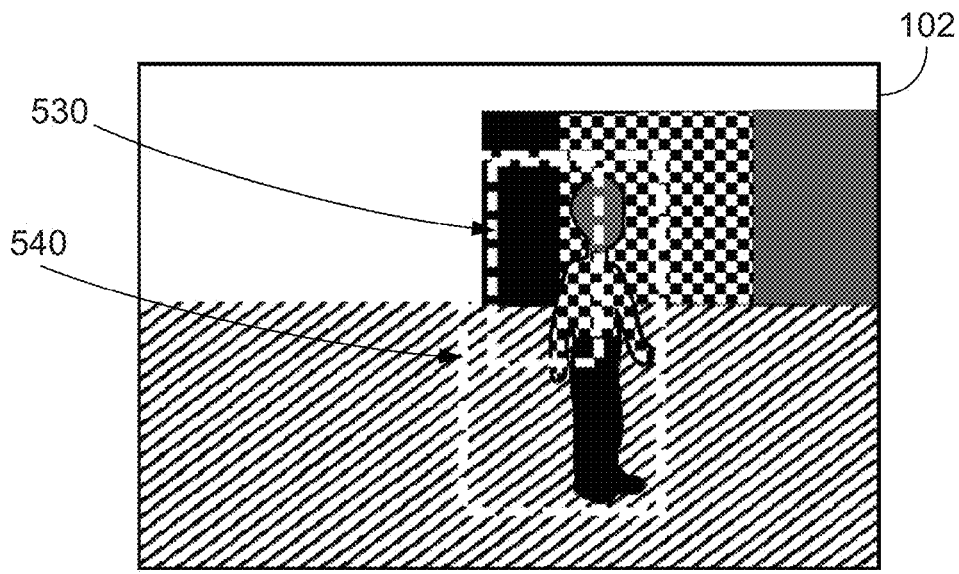
FIGS. 5A, 5B and 5C show respectively the video frame and back projections of the third frame, being that of FIG. 1C, a region of the first frame using a dynamic background compensated histogram, and further the utility of bounding box correction.

FIG. 5A illustrates the third frame 102 of the video sequence. If bounding box correction had not been applied, the Geometric Track Prediction bounding box $b_P$ may appear as something like the bounding box 530. As the size of the bounding box 420 has changed compared to the box 150, a track prediction algorithm that relies on analysing a series of geometric shapes will be less accurate. In addition, even if such a track prediction algorithm is accurate, the reduction in size of the bounding box means that any changes in motion of the tracked object will result in more of that object being outside the bounding box $b_P$ 530, even when using the Expanded Geometric Track Prediction bounding box $b_{p2}$, which is not shown in FIG. 5A but would have the same centre as bounding box $b_P$ 530 (but would be similar to a comparison of the bounding box 302 with the bounding box 301).

The bounding box 530 without bounding box correction also has problems when being used as the basis for Dynamic Background Compensation. In this example the Geometric Track Prediction Histogram $\{H_u^G\}_{u=1 \ldots m}$ will include a significant portion of the black building area 170, but will miss a large portion of the person's trousers. The histogram bin values for the person will therefore be skewed, and the Dynamic Background Compensation process is likely to penalise the wrong bins. For example, the Dynamic Background Compensation process would likely fail to penalise the black bin due to the histogram bin value of black being roughly the same as that of the Exemplar View Background-compensated Histogram $\{H_u^C\}_{u=1 \ldots m}$, and especially fail to penalise the checked shirt colour of the person due to the nearby presence of the building background 180.

Figure 5B:
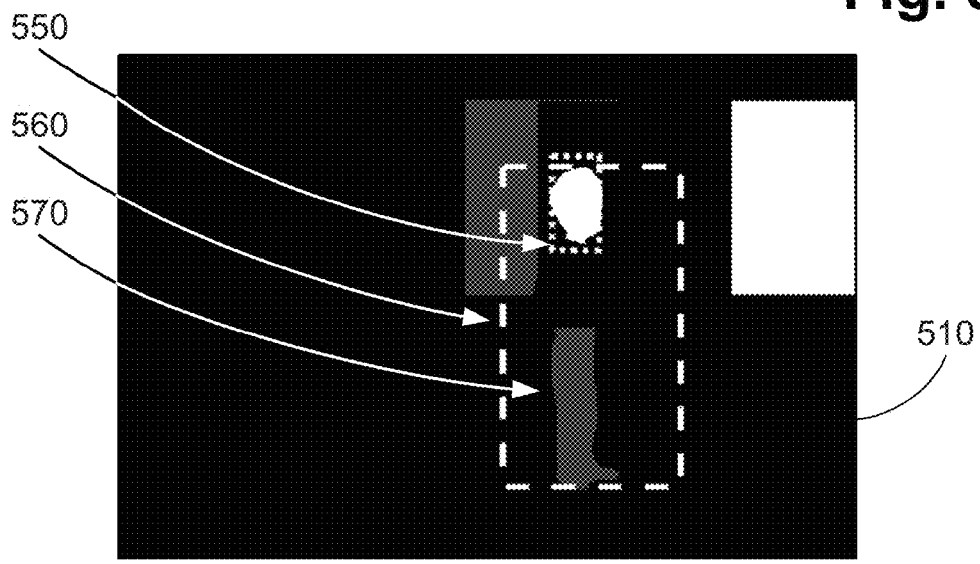
Figure 5C:
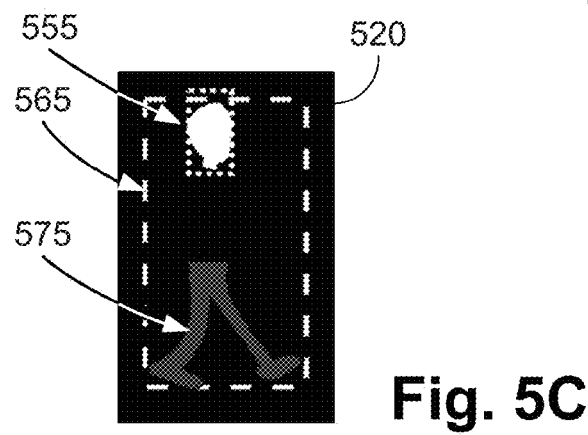

By contrast, the Geometric Track Prediction bounding box $b_P$ 540 in FIG. 5A, based on the corrected bounding box $b_C$ 430 of the previous frame, is more accurate. When using the Expanded Geometric Track Prediction bounding box $b_{p2}$, not illustrated (but would be a bounding box with the same centre but slightly larger height and width, like a comparison of bounding boxes 302 and 301 noted above) the Dynamic Background Compensation will correctly take into account the presence of the background building area 170, 180 in FIG. 1A and correspondingly de-emphasise the black and checked histogram values. FIG. 5B illustrates the resulting Current Frame Back Projection $B_{x,y}^i$ 510. The back projection has the highest strength for the region of the person's head, zero for the person's shirt, and a low value for the person's trousers 570. The subsequent mean-shift and CAMShift procedure result in the small bounding box 550 centred at the person's head. Applying the bounding-box correction procedure, the Dynamic Background-Compensated Histogram is applied to the Exemplar View, resulting in the back projection 520 illustrated in FIG. 5C. The bounding box 565 represents the Exemplar Track View bounding box $b_E$. As with the Current Frame Back Projection, the highest strength is for the head, there is zero strength for the shirt and background floor and sky, and there is a low strength for the person's trousers 575. The subsequent mean-shift and CAMShift procedure result in the small bounding box $b_T$ 555 centred at the person's head. Thus, the corrected bounding box $b_C$ can be calculated as the bounding box 560 seen in FIG. 5B, which is seen displaced to the right of the predicted position of the bounding box 540 of FIG. 5A.

In this instance the corrected bounding box $b_C$ 560 is substantially larger than the Current Frame Track Location $b_{i2}$ 550. It is possible for variations between the current appearance of the object and the exemplar view to result in substantial mismatches between the bounding boxes 550 and $b_T$ 555. In an alternate implementation the corrected bounding box $b_C$ is subject to track smoothing based on the prior bounding boxes of the track stored in the track data.

Figure 6A:
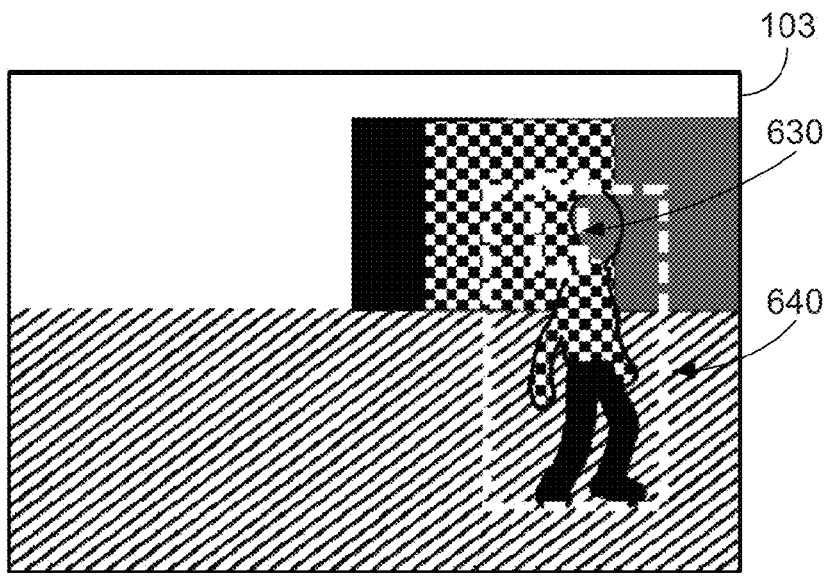
FIGS. 6A, 6B and 6C show respectively the video frame and back projections of the fourth frame, being that of FIG. 1D, a region of the first frame using a dynamic background compensated histogram, and further the utility of bounding box correction.

FIG. 6A illustrates the fourth frame 103 in the video sequence with a Geometric Track Prediction bounding box $b_P$ 630 based on the uncorrected bounding box $b_{i2}$ 550. As in the previous frame 102, it is apparent that using the bounding box 550 as the basis for the geometric track prediction will result in the loss of the track, as the person's head is now in front of the similarly coloured background building area 120 and the person's shirt is in front of the similarly coloured background building area 180. Use of boundary box correction $b_C$ 560 however results in a useful Geometric Track Prediction bounding box $b_P$ 640. In this case the Dynamic Background Compensation will result in the shirt and head colours being attenuated in the histogram $\{H_u^D\}_{u=1\ldots m}$ and Back Projection 610, while the legs 670 have a high probability. The mean-shift and CAMShift procedures result in the bounding box 660 around the person's legs. Applying the bounding-box correction procedure, the Dynamic Background-Compensated Histogram is applied to the Exemplar View, resulting in the back projection 620 illustrated in FIG. 6C. A bounding box 665 in FIG. 6C represents the Exemplar Track View bounding box $b_E$. As with the Current Frame Back Projection, the highest strength is for the trousers 675. The subsequent mean-shift and CAMShift procedures result in the small bounding box $b_T$ 655 centred at the person's trousers. Thus, the corrected bounding box $b_C$ can be calculated in the manner described above for step 980 to be the bounding box 650.

Figure 11:
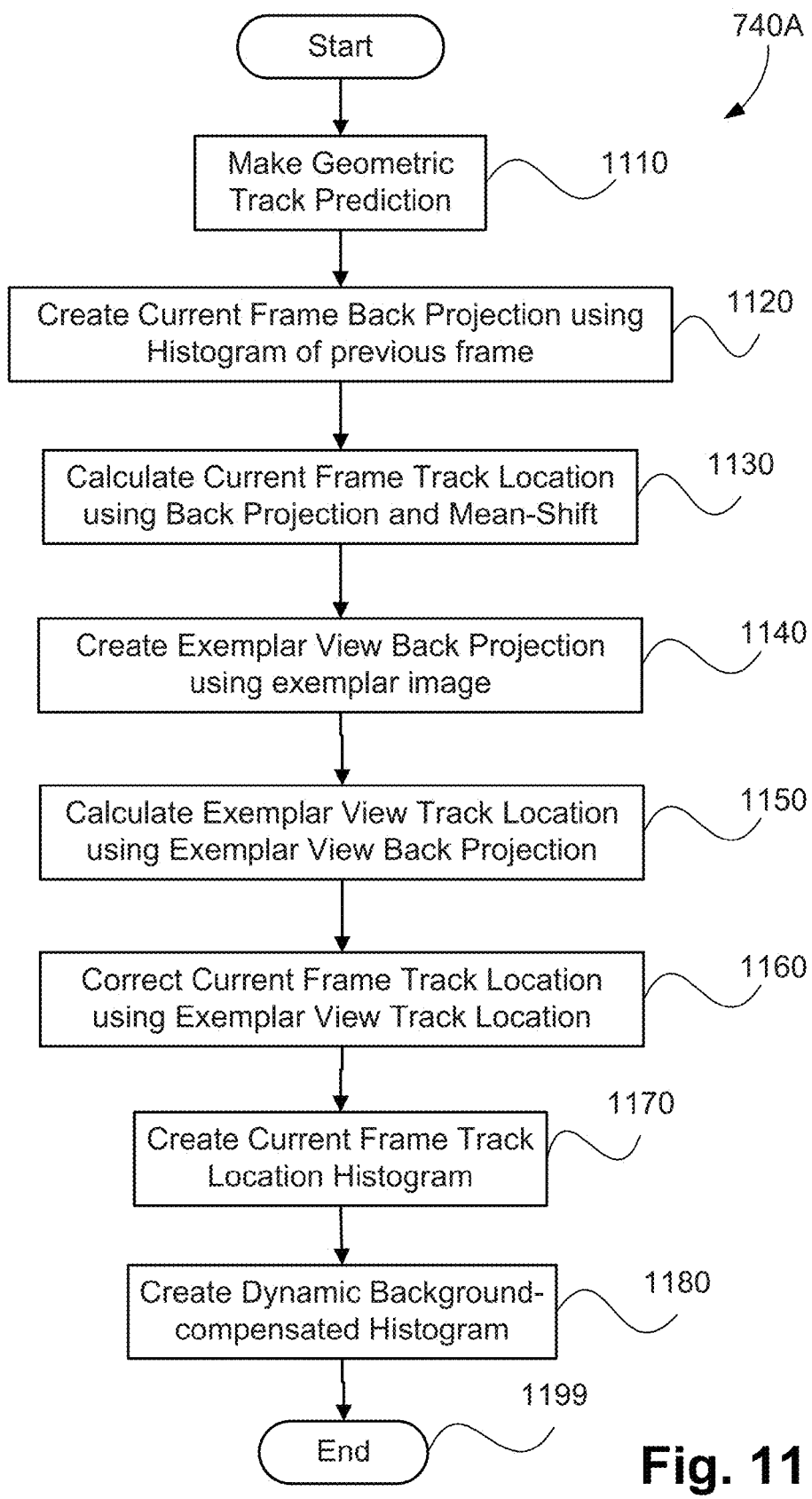
FIG. 11 is shows an alternate implementation of the subsystem of the tracker method of FIG. 7 operative for step 740.

FIG. 11 shows an alternate implementation of the subsystem of the tracker method 700 operative for step 740, for determining the current track location. The alternate implementation subsystem 740A starts with a step 1110 which makes a Geometric Track Prediction $b_P$ in the same way as in step 910.

The alternate tracker method then in step 1120 creates a Current Frame Back Projection using a histogram from the previous processed video frame. If the current video frame is the first video frame subsequent to the initial video frame 710, the histogram used in this step is the Exemplar View Background-compensated Histogram $H_u^C$. Otherwise, if the subsystem 740A has already operated on a subsequent video frame, the histogram used in this step is the Dynamic Background-Compensated Histogram $H_u^D$ generated during the subsystem processing 740A for the previous frame, in step 1180.

The alternate tracker method 740A then in step 1130 uses the mean-shift procedure to calculate the Current Frame Track Location $b_I$, using the same procedure as described in the preferred tracker method 950.

The alternate tracker method 740A then in step 1140 creates an Exemplar View Back Projection $B_{x,y}^E$ using the same procedure as described in the preferred tracker method 960.

The alternate tracker method 740A then in step 1150 calculates the Exemplar

View Track Location using the same procedure as described in the preferred tracker method 970.

The alternate tracker method 740A then in step 1160 creates a Corrected Current Frame Track Location $b_C$ using the same procedure as described in the preferred tracker method 980.

The alternate tracker method 740A then in step 1170 creates a Corrected Current Frame Track Location Histogram $\{H_u^{CC}\}_{u=1\ldots m}$ using the pixels of the area within an Expanded Corrected Current Frame Track Location bounding box $b_{C2}$, a bounding box with the same centre position as the Corrected Current Frame Track Location's bounding box $b_C$ but width and height multiplied by a constant, for example, $b_{C2}=(x_C,y_C,w_C\times 1.5, h_C\times 1.5)^T$. As in step 910, the histogram type, dimensions, and bin sizes of the Corrected Current Frame Track Location Histogram are the same as the Exemplar View Histogram determined in step 840.

The alternate tracker method 740A then in step 1180 creates a Dynamic Background-compensated Histogram $\{H_u^D\}_{u=1\ldots m}$ using the same procedure as described in the preferred tracker method 930, except using the Corrected Current Frame Track Location Histogram $\{H_u^{CC}\}_{u=1\ldots m}$ in place of the Geometric Track Prediction Histogram $H_u^G$.

The Dynamic Background-compensated Histogram $H_u^D$ is then stored for use in the next iteration of the Determine Current Track Location 740 step for a next video frame, in the step of creating a Current Frame Back Projection 1120.

The alternate tracker method as described in FIG. 11 can be thus seen as a similar approach as that of FIG. 9, except that it uses a more accurate (based on the output of the mean-shift tracker) background representation from a previous video frame, instead of a less accurate (based on the geometric track prediction) background representation from the current video frame. It should be appreciated that alternate implementations that apply to the preferred implementation as described in FIG. 9 may analogously applied to the alternate tracker method of FIG. 11.

Figure 6B:
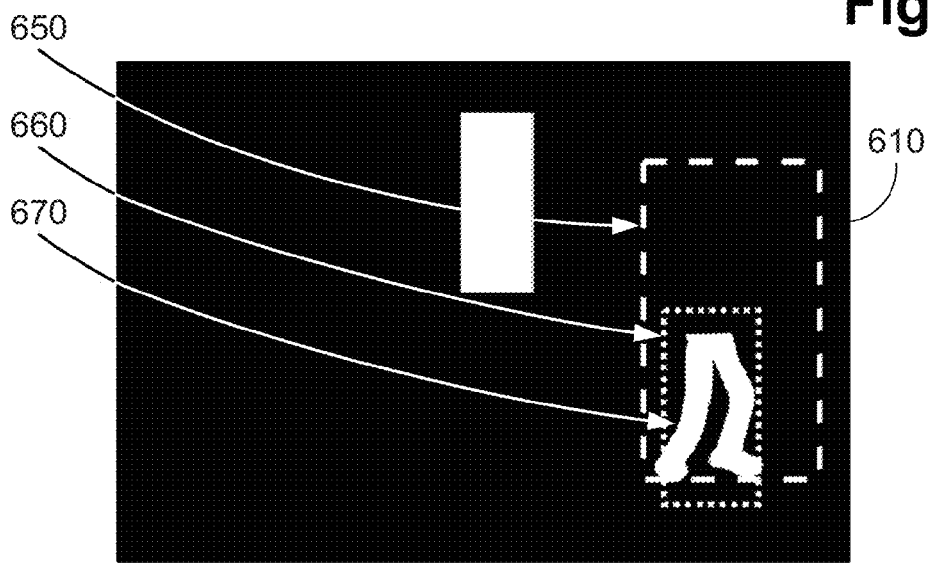
Figure 6C:
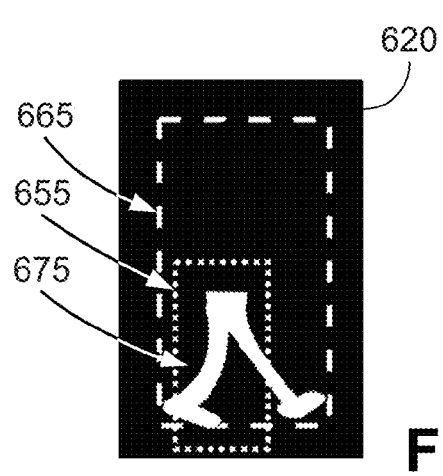

It can be seen that the bounding box correction of FIG. 6 allows the tracker method 700 to continue tracking in situations that would be extremely difficult for a tracker without bounding box correction. Dynamic Background Compensation allows the tracker to continue in the presence of background features that are visually similar to aspects of the appearance model of the object being tracked. Bounding box correction ensures that Dynamic Background Compensation remains resilient and ensures the tracker outputs accurate bounding boxes representing the object being tracked.

The preferred implementation describes tracking a video object across multiple frames with the use of a single exemplar view of the object. However, it is also possible to make use of multiple exemplar views of the object collected in the track data. An external subsystem such as Human Body Detection or foreground separation may be used to create one or more exemplar views for objects in a video frame, and it may do so over a number of frames. If there are multiple video objects in the frame, it is possible for a separate video object tracker such as the preferred implementation to be applied to each object. Existing tracks may have bounding boxes $b_C$ that need to be associated with these external subsystem exemplar views in order to ensure each object is being tracked by only one tracker.

There are many methods known in the art for performing this association. One example is known as the "greedy" algorithm, performed by creating a score for each potential association between existing track bounding boxes $b_C$ and new exemplar views based on their correspondence in location and size. The "greedy" algorithm operates by iteratively associating the best-scoring correspondences until a score threshold is reached or the list of exemplar views or tracks are all associated. This association process may result in multiple tracks being associated with a single exemplar view, and/or multiple exemplar views being associated with a single track.

In an alternate implementation, the object tracker is used with a greedy association algorithm and multiple instances may be run simultaneously on the same video data, one per track. In the case in which multiple tracks are associated with a single exemplar view, or multiple exemplar views are associated with a single track, the associated trackers are stopped, and a new tracker is started for each exemplar view. Otherwise, if a single track is associated with a single new exemplar view, the tracker adds the new exemplar view to the Exemplar View List in the track data and restarts the tracker at step 710 but does not initialise the track data at step 810, so that the existing track history of bounding boxes $b_C$ can be used when making the Geometric Track Prediction at step 910. When the Determine Current Track Location subsystem of step 740 and FIG. 9 subsequently makes use of the track data for the Exemplar View List (consisting of the Exemplar View bounding box $b_S$ the Exemplar View of the Object, and the Exemplar View Background-compensated Histogram $\{H_u^C\}_{u=1\ldots m}$), step 740 instead makes use of the most recent Exemplar View in the list.

In another alternate implementation of the object tracker, when referencing an element of the Exemplar View List (either making use of the Exemplar View bounding box $b_S$, the Exemplar View of the Object, or the Exemplar View Background-compensated Histogram $\{H_u^C\}_{u=1\ldots m}$) the Determine Current Track Location subsystem of step 740 can be run multiple times, once for each element of the Exemplar View List, to produce a set of bounding boxes $b_C$ equal to the number of exemplar views of the tracked object. An average bounding box $b_{C(AVERAGE)}$ can then be created and used as the track prediction for the current frame.

In another alternate implementation of the object tracker, when referencing an element of the Exemplar View List (either making use of the Exemplar View bounding box $b_S$, the Exemplar View of the Object, or the Exemplar View Background-compensated Histogram $\{H_u^C\}_{u=1\ldots m}$) the Determine Current Track Location subsystem 740 instead compiles a sub-list of Exemplar Views consisting of the Exemplar Views for which the determined track velocity and/or location are most similar to the current estimated track velocity and/or location. The Determine Current Track Location subsystem 740 then runs once for each element of the sub-list, producing a set of bounding boxes $b_C$. An average bounding box $b_{C(AVERAGE)}$ is then created and used as the track prediction for the current frame. The determination of track velocity is done by making use of the Track Position List to estimate centroid movement of the object over time. In a further alternate implementation, the determination of track velocity categorises each Exemplar View as being either moving left, moving right, moving up, moving down, or not moving, and likewise categorises the current track movement. The sub-list then consists of only those Exemplar Views that share a category with the current track movement. In this way, differences in appearance of the object from different angles may be taken into account.

INDUSTRIAL APPLICABILITY

The arrangements described are applicable to the computer and data processing industries and particularly for the video surveillance industry, for example for security and consumer behaviour analysis.

The foregoing describes only some embodiments of the present invention, and modifications and/or changes can be made thereto without departing from the scope and spirit of the invention, the embodiments being illustrative and not restrictive.

The invention claimed is:

1. A method for tracking an object across a number of image frames, the method comprising:
   identifying a region containing the object in a first image frame to be stored as an exemplar view of the object;
   creating an appearance model based on the region in the first image frame and a background region in a second image frame;
   determining at least one of a location and size of a predicted region for tracking the object in the second image frame using the appearance model; and
   correcting at least one of the determined location and size of the predicted region in the second image frame in accordance with at least one of the location and size of the region in the first image frame corresponding to the exemplar view of the object.

2. A method according to claim 1 wherein the creating of the appearance model comprises:
   forming a track prediction for the exemplar view in the second frame;
   establishing a predicted background region of the second frame using the track prediction; and
   modifying an appearance model of the second frame by reducing features of the appearance model in accordance with their representation in the predicted background region.

3. A method according to claim 2 wherein the track prediction consists of a region being identical to the identified region.

4. A method according to claim 2 wherein the track prediction comprises a region with a position and size according to a prediction from prior positions of the track using a Kalman filter.

5. A method according to claim 2 wherein the appearance model is formed as a dynamic background compensated histogram.

6. A method according to claim 2 wherein the appearance model is attenuated based on at least one of:
   (i) a difference between histogram values; and
   (ii) a ratio of histogram values.

7. A method according to claim 1 wherein the determining of the predicted region comprises
   creating a current frame back projection using the modified appearance model; and
   calculating a track location in the second frame using the back projection and the mean-shift procedure.

8. A method according to claim 7 wherein a CAMShift procedure is further used to refine the track location in the second frame.

9. A method according to claim 1 wherein the correcting comprises:
   forming an exemplar view back projection using the modified appearance model;
   calculating the predicted region as an exemplar view track location using the exemplar view back projection; and
   correcting the track location in the second frame using the exemplar view track location.

10. A method according to claim 1 wherein the process of identifying a region and creating an appearance model are performed for multiple image frames, and wherein one or more appearance models are chosen for the process of determining and correcting a predicted region.

11. A method according to claim 10 wherein at least one of:
   (i) a corrected prediction region is created from an average of the corrected predicted regions for a subset of the appearance models;
   (ii) the subset of the appearance models is the full list of appearance models;
   (iii) the subset of the appearance models is chosen according to a metric of similarity between statistics relating to the appearance model and the track prediction;
   (iv) the metric of similarity between the appearance model and the track prediction is similarity of direction of movement; and
   (v) the metric of similarity between the appearance model and the track prediction is similarity of position.

12. A method according to claim 1, comprising:
   forming a geometric track prediction for the object in the second frame;
   creating a geometric track prediction histogram for the second frame;
   creating a dynamic background compensated histogram for the second frame using the exemplar view of the object from the first frame;
   creating a back projection on the second frame using the dynamic background-compensated histogram;
   calculating a track location in the second frame using the back projection and the mean-shift procedure;

creating an exemplar view back projection using the dynamic background-compensated histogram on the exemplar image;
calculating an exemplar view track location using the exemplar view back projection; and
correcting the track location in the second frame using the exemplar view track location.

13. A method for tracking an object across a number of image frames, the method comprising:
identifying a region containing the object in a first image frame to be stored as an exemplar view of the object;
creating an initial appearance model based on the region in the first image frame and a background region in the first image frame; and then for subsequent video frames in a video sequence
determining at least one of a location and size of a predicted region for tracking the object in the subsequent image frame using at least one of the initial appearance model and an updated appearance model;
correcting at least one of the determined location and size of the predicted region in the subsequent image frame in accordance with at least one of the location and size of the region in the first image frame corresponding to the exemplar view of the object; and
creating an updated appearance model.

14. A method according to claim 13 wherein the creating of the updated appearance model comprises:
modifying an appearance model of the first frame by reducing features of the appearance model in accordance with their representation in the background region based on the corrected determined location and size; and
forming the updated appearance model is formed as a dynamic background compensated histogram.

15. A method according to claim 13 wherein the determining of the predicted region comprises:
creating a current frame back projection using the modified appearance model; and
calculating a track location in the second frame using the back projection and the mean-shift procedure;
wherein a CAMShift procedure is further used to refine the track location in the second frame.

16. A method according to claim 13 wherein the correcting comprises:
forming an exemplar view back projection using the modified appearance model;
calculating the predicted region as an exemplar view track location using the exemplar view back projection; and
correcting the track location in the second frame using the exemplar view track location.

17. A method according to claim 13 wherein the processes of identifying a region and creating an appearance model are performed for multiple image frames, and wherein at least one of:

(i) one or more appearance models are chosen for the process of determining and correcting a predicted region;
(ii) a corrected prediction region is created from an average of the corrected predicted regions for a subset of the appearance models;
(iii) the subset of the appearance models is the full list of appearance models;
(iv) the subset of the appearance models is chosen according to a metric of similarity between statistics relating to the appearance model and the track prediction; and
(v) the metric of similarity between the appearance model and the track prediction is similarity of direction of movement.

18. A method according to claim 1 comprising attenuating the appearance model based on a difference.

19. A non-transitory computer readable storage medium having a program recorded thereon, the program being executable by a processor to track an object across a number of image frames, the program comprising:
code for identifying a region containing the object in a first image frame to be stored as an exemplar view of the object;
code for creating an appearance model based on the region in the first image frame and a background region in a second image frame;
code for determining at least one of a location and size of a predicted region for tracking the object in the second image frame using the appearance model; and
code for correcting at least one of the determined location and size of the predicted region in the second image frame in accordance with at least one of the location and size of the region in the first image frame corresponding to the exemplar view of the object.

20. Apparatus for tracking an object across a number of image frames, the apparatus comprising a processor coupled to a memory in which are stored the image frames and a program, the program comprising code means for performing the steps of:
identifying a region containing the object in a first image frame to be stored as an exemplar view of the object;
creating an appearance model based on the region in the first image frame and a background region in a second image frame;
determining at least one of a location and size of a predicted region for tracking the object in the second image frame using the appearance model; and
correcting at least one of the determined location and size of the predicted region in the second image frame in accordance with at least one of the location and size of the region in the first image frame corresponding to the exemplar view of the object.

* * * * *